(12) United States Patent
Nakagawa

(10) Patent No.: US 9,025,988 B2
(45) Date of Patent: May 5, 2015

(54) IMAGE FORMING APPARATUS AND BIAS POWER SUPPLY APPARATUS AND METHOD

(71) Applicant: Fuji Xerox Co., Ltd., Minato-ku, Tokyo (JP)

(72) Inventor: Masakazu Nakagawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 114 days.

(21) Appl. No.: 13/739,733

(22) Filed: Jan. 11, 2013

(65) Prior Publication Data

US 2014/0086611 A1  Mar. 27, 2014

(30) Foreign Application Priority Data

Sep. 25, 2012  (JP) .................................. 2012-211180

(51) Int. Cl.
*G03G 15/00* (2006.01)
*H02M 3/335* (2006.01)
*H02M 7/538* (2007.01)

(52) U.S. Cl.
CPC ........... *G03G 15/80* (2013.01); *H02M 3/33507* (2013.01); *H02M 7/53803* (2013.01)

(58) Field of Classification Search
CPC ... G03G 15/80; G03G 15/5004; G03G 15/00; H02M 3/33507; H02M 7/217
USPC ......................................................... 399/88
See application file for complete search history.

(56) References Cited

U.S. PATENT DOCUMENTS

| 3,649,922 | A   | * | 3/1972  | Ralph et al. .................... 327/105 |
| 4,562,524 | A   | * | 12/1985 | Mutoh et al. .................... 363/41 |
| 8,903,263 | B2  | * | 12/2014 | Matsumoto ...................... 399/88 |
| 2010/0213769 | A1 | * | 8/2010 | Sakakibara ...................... 307/82 |

FOREIGN PATENT DOCUMENTS

JP         06-194908 A     7/1994

OTHER PUBLICATIONS

Machine translation of (Motoyama JP 06194908 A), publication date: Jul. 15, 1994.*

* cited by examiner

*Primary Examiner* — Walter L Lindsay, Jr.
*Assistant Examiner* — Frederick Wenderoth
(74) *Attorney, Agent, or Firm* — Sughrue Mion, PLLC

(57) ABSTRACT

An image forming apparatus includes an image carrier and the following elements. A charging unit generates a charging electric field and charges the image carrier with the charging electric field. An exposure unit exposes the charged image carrier to light and forms an electrostatic latent image on the image carrier. A developing unit generates a developing electric field and develops the electrostatic latent image. A transfer unit transfers the developed image onto a transfer subject. At least one of the charging electric field and the developing electric field is generated by a bias power supply unit including a transformer having a primary winding and a secondary winding, and also including the following elements. A switch circuit supplies a current to the primary winding of the transformer by switching a switching device. A modulator circuit generates a PWM modulation signal. A waveform setting unit sets a waveform of a carrier signal.

9 Claims, 11 Drawing Sheets

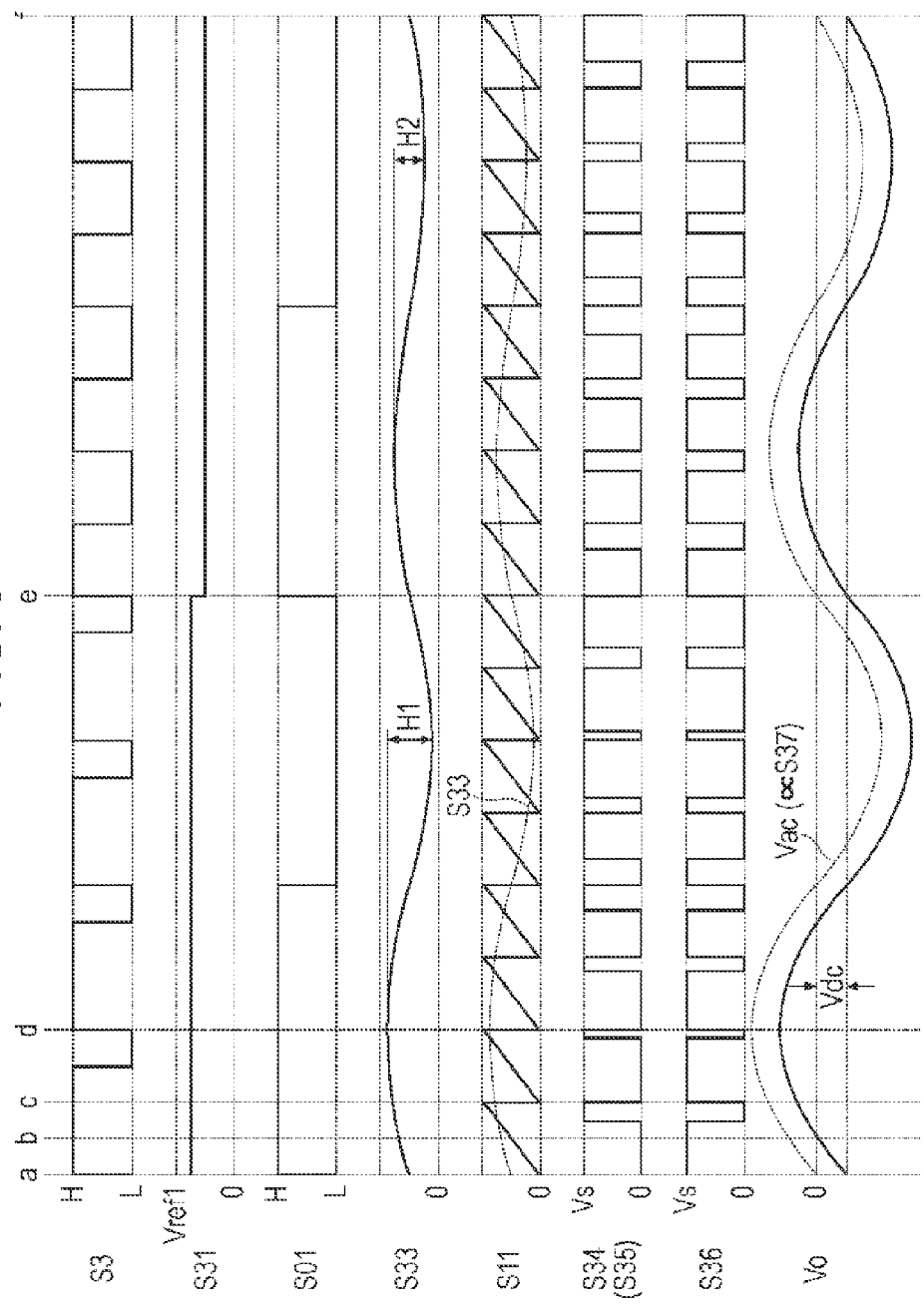

IMAGE FORMING APPARATUS AND BIAS POWER SUPPLY APPARATUS AND METHOD

CROSS-REFERENCE TO RELATED APPLICATIONS

This application is based on and claims priority under 35 USC 119 from Japanese Patent Application No. 2012-211180 filed Sep. 25, 2012.

BACKGROUND

Technical Field

The present invention relates to an image forming apparatus and a bias power supply apparatus and method.

SUMMARY

According to an aspect of the invention, there is provided an image forming apparatus including: an image carrier; a charging unit that generates a charging electric field in which AC and DC are superposed on each other and that charges the image carrier with the generated charging electric field; an exposure unit that exposes the image carrier charged by the charging unit to light and that forms an electrostatic latent image on the image carrier; a developing unit that generates a developing electric field in which AC and DC are superposed on each other and that develops the electrostatic latent image formed on the image carrier so as to form a developed image; and a transfer unit that transfers the developed image onto a transfer subject. At least one of the charging electric field generated by the charging unit and the developing electric field generated by the developing unit is generated by a bias power supply unit. The bias power supply unit includes a transformer including a primary winding and a secondary winding, AC power being output from the secondary winding as a result of a current being supplied to the primary winding, a switch circuit that includes a switching device and that supplies a current to the primary winding of the transformer by switching the switching device on the basis of a received modulation signal, a modulator circuit that receives a frequency setting signal for setting a frequency of the AC power and a carrier signal for setting a frequency of the modulation signal and that generates the modulation signal subjected to pulse width modulation on the basis of the frequency setting signal and the carrier signal, and a waveform setting unit that sets a waveform of the carrier signal.

BRIEF DESCRIPTION OF THE DRAWINGS

Exemplary embodiments of the present invention will be described in detail based on the following figures, wherein:

FIG. 9 is a timing chart illustrating the operation of a charging bias power supply unit when the waveform of a carrier signal is a sawtooth wave, which is different from the carrier signal used in the first exemplary embodiment;

DETAILED DESCRIPTION

Exemplary embodiments of the present invention will be described below with reference to the accompanying drawings.

First Exemplary Embodiment
Image Forming Apparatus 1

Figure 1:
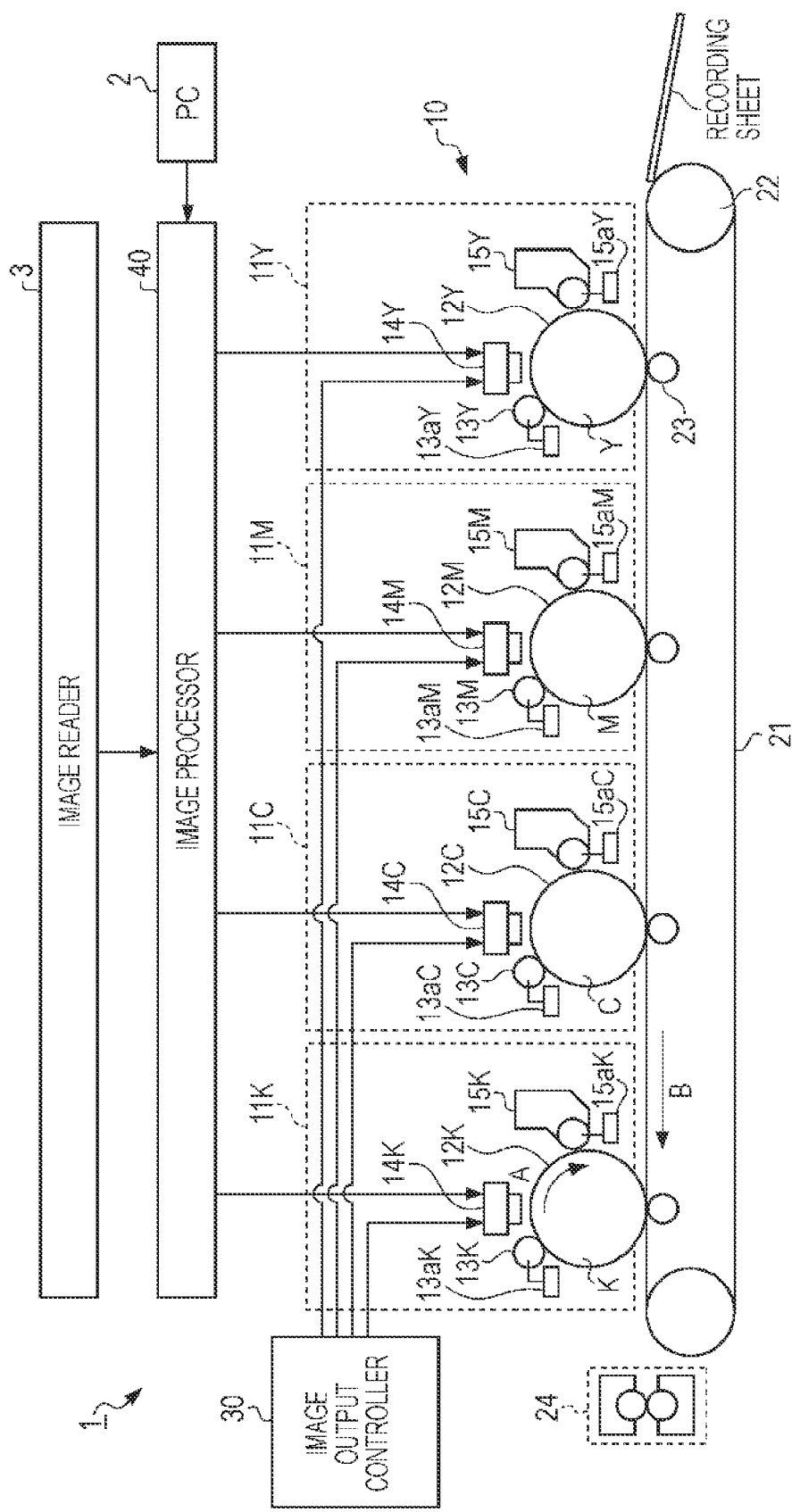
FIG. 1 illustrates an example of the overall configuration of an image forming apparatus according to a first exemplary embodiment.

FIG. 1 illustrates an example of the overall configuration of an image forming apparatus 1 according to a first exemplary embodiment. The image forming apparatus 1 shown in FIG. 1 is an apparatus generally referred to as a "tandem image forming apparatus". The image forming apparatus 1 includes an image forming processor 10, an image output controller 30, and an image processor 40. The image forming processor 10 forms images corresponding to image data items of individual colors. The image output controller 30 controls the image forming processor 10. The image processor 40 is connected to a personal computer (PC) 2 or an image reader 3 and performs predetermined image processing on image data received from the PC 2 or the image reader 3.

The image forming processor 10 includes plural image forming units 11Y, 11M, 11C, and 11K disposed in parallel with each other at predetermined intervals. When the image forming units 11Y, 11M, 11C, and 11K are not distinguished between each other, they will be referred to as the "image forming unit 11" or "image forming units 11".

The image forming unit 11K includes a photoconductor drum 12K, a charging roller 13K, a print head 14K, and a developing device 15K. The photoconductor drum 12K forms electrostatic latent images and holds toner images thereon. The charging roller 13K charges the surface of the photoconductor drum 12K at a predetermined voltage (charging electric field (charging bias)). The print head 14K exposes the photoconductor drum 12K charged by the charging roller 13K to light. The developing device 15K develops electrostatic latent images obtained by the print head 14K.

A charging bias power supply unit 13aK is connected to the charging roller 13K and supplies a charging bias to charge the photoconductor drum 12K. A developing bias power supply unit 15aK is connected to the developing device 15K and supplies a predetermined voltage (developing electric field (developing bias)) to the developing device 15.

The other image forming units 11Y, 11M, and 11C are formed similarly to the image forming unit 11K. That is, in the image forming units 11Y, 11M, and 11C, "K" in the photoconductor drum 12K, the charging roller 13K, the print head 14K, the developing device 15K, the charging bias power supply unit 13aK, and the developing bias power supply unit 15aK are replaced by "Y", "M", and "C", respectively. When the photoconductor drums 12Y, 12M, 12C, and 12K are not distinguished between each other, they will be referred to as the "photoconductor drum 12" or "photoconductor drums 12". When the charging rollers 13Y, 13M, 13C, and 13K are not distinguished between each other, they will be referred to as the "charging roller 13" or "charging rollers 13". When the print heads 14Y, 14M, 14C, and 14K are not distinguished between each other, they will be referred to as the "print head 14" or "print heads 14". When the developing devices 15Y, 15M, 15C, and 15K are not distinguished between each other, they will be referred to as the "developing device 15" or "developing devices 15". When the charging bias power supply units 13aY, 13aM, 13aC, and 13aK are not distinguished between each other, they will be referred to as the "charging bias power supply unit 13a" or "charging bias power supply units 13a". When the developing bias power supply units 15aY, 15aM, 15aC, and 15aK are not distinguished between each other, they will be referred to as the "developing bias power supply unit 15a" or "developing bias power supply units 15a".

Toners stored in the developing devices 15K, 15Y, 15M, and 15C are different. Accordingly, the image forming units 11Y, 11M, 11C, and 11K form toner images of yellow (Y), magenta (M), cyan (C), and black (K), respectively.

The charging roller 13 is an example of a charging unit, the photoconductor drum 12 is an example of an image carrier, the print head 14 is an example of an exposure unit, and the developing device 15 is an example of a developing unit.

The charging roller 13 may be formed as follows. An epichlorohydrin rubber layer is formed on the surface of a metallic shaft, and then, polyamide having a thickness of 3 μm containing tin-oxide conductive powder is applied to the surface of the epichlorohydrin rubber layer.

As the photoconductor drum 12, an organic photosensitive layer formed on the surface of, for example, a metallic, thin-walled cylindrical drum is used. When the organic photosensitive layer is charged, it is negatively charged. The developing device 15 develops electrostatic latent images by using the reversal developing method. In this method, toner used in the developing device 15 is of a negative charging type.

The voltage output from the charging bias power supply unit 13a to supply a charging bias to the charging roller 13 is a voltage obtained by superposing a direct-current (DC) voltage of −600 V on an alternating-current (AC) voltage having a 2 kV peak-to-peak value (p-p value) at a frequency of 2 kHz. The voltage output from the developing bias power supply unit 15a to supply a developing bias to the developing device 15 is a voltage obtained by superposing a DC voltage of −500 V on an AC voltage having a 1 kV p-p value at a frequency of 8 kHz.

The charging bias power supply unit 13a and the developing bias power supply unit 15a of the first exemplary embodiment are switching power supply sources using a high-frequency modulation method (class-D amplifier). More specifically, the charging bias power supply unit 13a and the developing bias power supply unit 15a obtain AC or DC high-voltage output power by switching (turning ON and OFF) a switching device. This will be discussed later.

Switching power supply sources using a high-frequency modulation method are effective in contributing to energy saving.

The image forming apparatus 1 includes a sheet transport belt 21, driving rollers 22, transfer rollers 23, and a fixing unit 24. The sheet transport belt 21 transports a recording sheet, which is an example of a transfer subject, in order to transfer toner images of individual colors formed by the associated image forming units 11Y, 11M, 11C, and 11K onto the recording sheet. The driving rollers 22 are rollers for driving the sheet transport belt 21. The transfer rollers 23, each of which is an example of a transfer unit, transfer toner images formed on the photoconductor drums 12 onto a recording sheet. The fixing unit 24 fixes toner images on a recording sheet.

In the image forming apparatus 1, the image forming processor 10 performs an image forming operation on the basis of various control signals supplied from the image output controller 30. Then, under the control of the image output controller 30, the image processor 40 performs image processing on image data received from the PC 2 or the image reader 3 and supplies the processed image data to the image forming units 11Y, 11M, 11C, and 11K. Then, in the black (K) image forming unit 11K, for example, while being rotated in the direction indicated by the arrow A in FIG. 1, the photoconductor drum 12K is charged to a predetermined charging bias by the charging roller 13K and is exposed to light emitted from the print head 14K, which emits light on the basis of image data supplied from the image processor 40. Then, an electrostatic latent image indicating a K image is formed on the photoconductor drum 12K. The electrostatic latent image formed on the photoconductor drum 12K is then developed by the developing device 15K, thereby forming a K toner image on the photoconductor drum 12K.

In this case, the developing device 15K develops electrostatic latent images by using the reversal developing method. The surface of the photoconductor drum 12K is charged to a charging bias (e.g., a DC voltage of −600 V). When writing an image into the surface of the photoconductor drum 12K by the print head 14K, the electrical conductivity on the surface of the photoconductor drum 12K is increased, and the voltage of a portion exposed to light by the print head 14K is changed from −600 V to, for example, −200 V. Meanwhile, a developing bias (e.g., a DC voltage of −500 V) is supplied to the developing device 15K in which toner is stored. Then, toner, which is of a negative charging type, adheres to the portion having a voltage of −200 V on the surface of the photoconductor drum 12K. In this manner, a K toner image is formed.

Similarly, in the image forming units 11Y, 11M, and 11C, Y, M, and C toner images, respectively, are formed.

The toner images formed by the associated image forming units 11 are electrostatically transferred sequentially, due to a transfer electric field (transfer bias) applied to the transfer rollers 23, to a recording sheet which is supplied in accordance with the movement of the sheet transport belt 21 moving in the direction indicated by the arrow B in FIG. 1. Then, on the recording sheet, synthesized toner images obtained by superposing the toner images of individual colors on one another are formed.

Subsequently, the recording sheet on which the synthesized toner images are formed is transported to the fixing unit 24. The fixing unit 24 performs fixing processing using heat and pressure on the synthesized toner images so as to fix the toner images on the recording sheet, and then, the recording sheet is discharged from the image forming apparatus 1.

Figure 2:
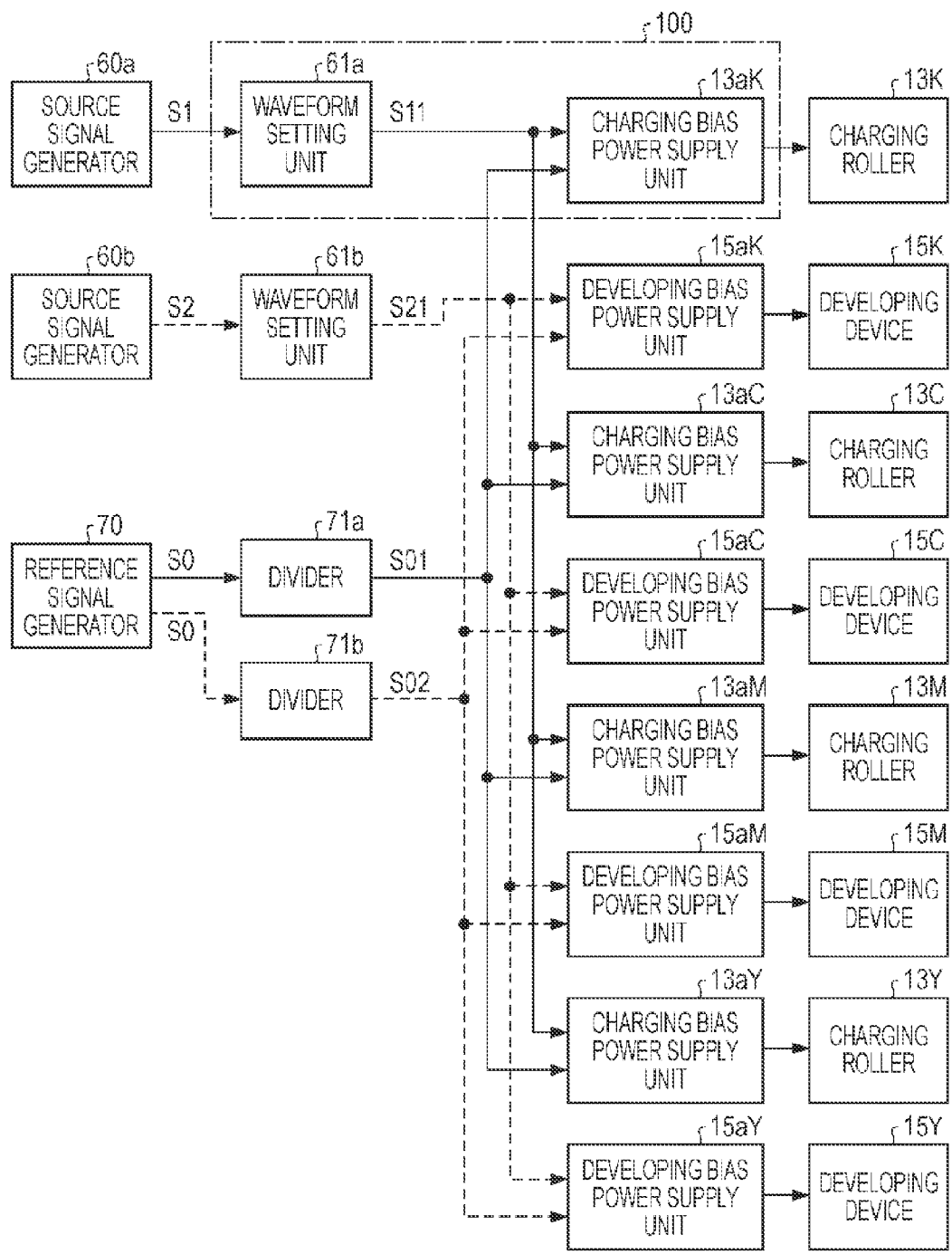
FIG. 2 illustrates part of the image forming apparatus related to the supply of a charging bias and a developing bias.

FIG. 2 illustrates part of the image forming apparatus 1 related to the supply of a charging bias and a developing bias.

As shown in FIG. 2, part of the image forming apparatus 1 related to the supply of a charging bias and a developing bias includes, not only the charging bias power supply units 13aK, 13aC, 13aM, and 13aY and the developing bias power supply units 15aK, 15aC, 15aM, and 15aY, but also source signal generators 60a and 60b, waveform setting units 61a and 61b, which are examples of waveform setting units, a reference signal generator 70, and dividers 71a and 71b.

When the source signal generators 60a and 60b are not distinguished between each other, they will be referred to as the "source signal generator 60" or "source signal generators 60". When the waveform setting units 61a and 61b are not distinguished between each other, they will be referred to as the "waveform setting unit 61" or "waveform setting units 61".

The source signal generator 60a generates a source signal S1 having a predetermined repetition frequency (frequency). The waveform setting unit 61a receives the source signal S1 from the source signal generator 60a and outputs a carrier signal S11 which is set to be a predetermined waveform, on the basis of the source signal S1. The charging bias power supply units 13aK, 13aC, 13aM, and 13aY receive the carrier signal S11 output from the waveform setting unit 61a.

The reference signal generator 70 outputs a reference signal S0. The divider 71a receives the reference signal S0 output from the reference signal generator 70 and outputs a clock signal S01 generated by dividing the reference signal S0. The charging bias power supply units 13aK, 13aC, 13aM, and 13aY receive the clock signal S01 output from the divider 71a.

Similarly, the source signal generator 60b generates a source signal S2 having a predetermined repetition frequency (frequency). The waveform setting unit 61b receives the source signal S2 from the source signal generator 60b and outputs a carrier signal S21 which is set to be a predetermined waveform, on the basis of the source signal S2. The developing bias power supply units 15aK, 15aC, 15aM, and 15aY receive the carrier signal S21 output from the waveform setting unit 61b.

The divider 71b outputs a clock signal S02 generated by dividing the reference signal S0 received from the source signal generator 70. The developing bias power supply units 15aK, 15aC, 15aM, and 15aY receive the clock signal S02 output from the divider 71b.

The repetition frequencies of the carrier signals S11 and S21 are repetition frequencies at which switching devices are switched (turned ON and OFF). This will be discussed later.

It is assumed that the source signals S1 and S2 are square waves having different frequencies but having the same duty ratio of 50%. The carrier wave S11 is a signal having the same frequency as that of the source signal S1 and having a waveform different from that of the source signal S1. Similarly, the carrier wave S21 is a signal having the same frequency as that of the source signal S2 and having a waveform different from that of the source signal S2.

The frequencies of the source signals S1 and S2 may be the same. The source signals S1 and S2 do not have to be a square wave having a duty ratio of 50%, and may be a square wave having a different duty ratio or another type of waveform. Even if the duty ratio of the waveform of the source signals S1 and S2 is not 50%, the repetition frequency of this waveform will also be referred to as a "frequency" as in a sine wave, a triangle wave, or a square wave.

Similarly, it is also assumed that the reference signal S0 is a square wave having a duty ratio of 50%. The clock signal S01 is a signal obtained by dividing the reference signal S0 by using the divider 71a so that the frequency of the clock signal S01 may be lower than that of the reference signal S0. Similarly, the clock signal S02 is a signal obtained by dividing the reference signal S0 by using the divider 71b so that the frequency of the clock signal S02 may be lower than that of the reference signal S0.

The frequencies of the clock signals S01 and S02 are frequencies of AC components to be superposed on DC components in a charging bias and a developing bias, respectively. This will be discussed later.

It is assumed that the clock signals S01 and S02 are square waves have different frequencies but having the same duty ratio of 50%. The frequencies of the clock signals S01 and S02 may be the same.

The duty ratio of the reference signal S0 and the clock signals S01 and S02 is 50%. However, the duty ratio of these signals may be a ratio other than 50%, as long as the frequency of AC components to be superposed on DC components in a charging bias is set by the clock signal S01 and the frequency of AC components to be superposed on DC components in a developing bias is set by the clock signal S02.

As described above, in the charging bias power supply unit 13a of the image forming apparatus 1, the switching device is switched (turned ON and OFF) in response to the frequency of the carrier signal S11, and also, a charging bias in which the AC components of the frequency of the clock signal S01 are superposed on DC components is generated. Similarly, in the developing bias power supply unit 15a of the image forming apparatus 1, the switching device is switched (turned ON and OFF) in response to the frequency of the carrier signal S21, and also, a developing bias in which the AC components of the frequency of the clock signal S02 are superposed on DC components is generated.

Bias Power Supply Source Apparatus 100
Block Configuration of Bias Power Supply Apparatus 100

It is assumed, for example, that a bias power supply apparatus 100 includes the charging bias power supply unit 13aK and the waveform setting unit 61a. Instead of the charging bias power supply unit 13aK, any one of the charging bias power supply units 13aC, 13aM, and 13aY may be included. The bias power supply apparatus 100 may also include the divider 71a.

Another example of the bias power supply apparatus 100 may include the developing bias power supply unit 15aK and the waveform setting unit 61b. Instead of the developing bias power supply unit 15aK, any one of the developing bias power supply units 15aC, 15aM, and 15aY may be included. The bias power supply apparatus 100 may also include the divider 71b.

Still another example of the bias power supply apparatus 100 may include the charging bias power supply unit 13a (at least one of the charging bias power supply units 13aK, 13aC, 13aM, and 13aY), the developing bias power supply unit 15a (at least one of the developing bias power supply units 15aK, 15aC, 15aM, and 15aY), and the waveform setting units 61a and 61b.

Further, this bias power supply apparatus 100 may also include the source signal generators 60a and/or 60b and the reference signal generator 70.

A description will now be given below by way of example, assuming that the bias power supply apparatus 100 includes the charging bias power supply unit 13aK and the waveform setting unit 61a. In this case, the bias power supply apparatus 100 uses the charging roller 13K as a load.

In FIG. 1, the source signal generators 60a and 60b, the waveform setting units 61a and 61b, the reference signal generator 70, and the dividers 71a and 71b are not shown. These components may be disposed in the image output controller 30 or may be disposed separately from the image output controller 30. A description will be given below, assuming that these components are disposed separately from the image output controller 30.

A description will now be given below in detail, with reference to FIG. 3, of an example of the block configuration of the bias power supply apparatus 100 including the charging bias power supply unit 13aK and the waveform setting unit 61a.

The charging bias power supply unit 13aK of the bias power supply apparatus 100 includes an AC output section 1200 which outputs AC power and a DC output section 1250 which outputs DC power. The AC output section 1200 and the DC output section 1250 each serve as a switching power supply source that generates high-voltage output power by switching (turning ON and OFF) a switching device. In the example shown in FIG. 3, the AC output section 1200 is of a separate-excitation type, and the DC output section 1250 is of a self-excitation type.

The AC output section 1200 of the charging bias power supply unit 13aK includes an analog voltage converter circuit 1201, an amplifier circuit 1202, a first low-pass filter 1203, a modulator circuit 1204, which is an example of a modulator, a drive circuit 1205, a switch circuit 1206, which is an example of a switching unit, a second low-pass filter 1207, a transformer 1208, an AC current detecting circuit 1209, and an AC voltage detecting circuit 1210.

Figure 3:
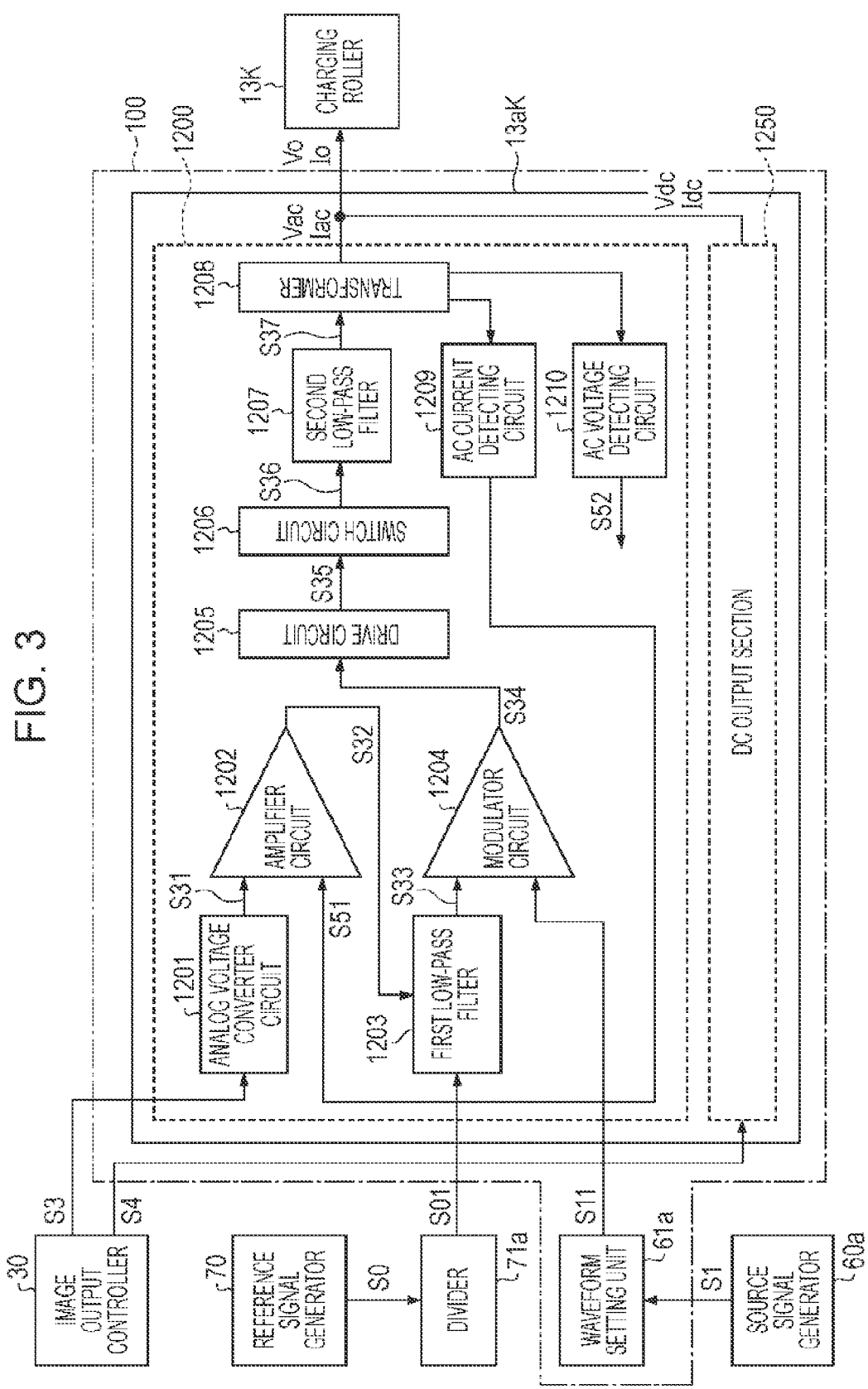
FIG. 3 illustrates an example of the block configuration of a bias power supply apparatus including a charging bias power supply unit and a waveform setting unit.
Figure 4:
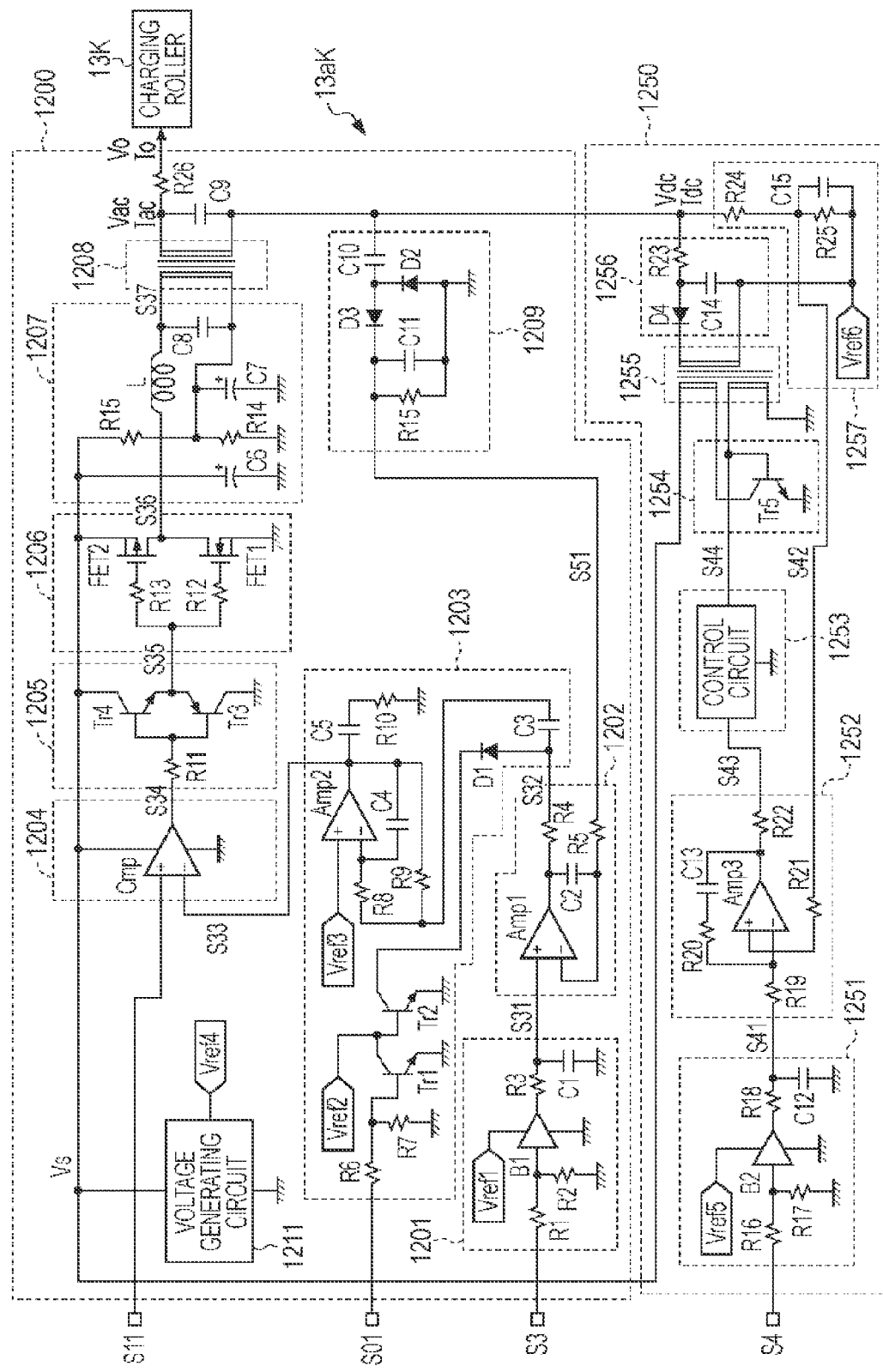
FIG. 4 illustrates an example of the circuit configuration of a charging bias power supply unit.

In FIG. 3, the block configuration of the DC output section 1250 of the charging bias power supply unit 13aK is not shown (see FIG. 4).

The analog voltage converter circuit 1201 receives an AC current setting signal S3 from the image output controller 30. The AC current setting signal S3 is a signal subjected to pulse width modulation (PWM) and is used for setting the value of an AC (sine wave) current Iac output from the transformer 1208 in accordance with the duty ratio. The duty ratio is, for example, 3% to 100%. The analog voltage converter circuit 1201 then generates a signal indicating a voltage corresponding to the duty ratio of the received AC current setting signal S3 (such a signal will be hereinafter referred to as an "analog voltage signal S31") and transmits the analog voltage signal S31 to the amplifier circuit 1202.

The amplifier circuit 1202 receives the analog voltage signal S31 output from the analog voltage converter circuit 1201 and a DC voltage detection signal S51 output from the AC current detecting circuit 1209. Details of the AC current detecting circuit 1209 will be discussed later.

Then, the amplifier circuit 1202 amplifies the voltage difference between the analog voltage signal S31 and the DC voltage detection signal S51 and thereby generates an error amplification signal S32. The amplifier circuit 1202 transmits the error amplification signal S32 to the first low-pass filter 1203.

The first low-pass filter 1203 receives the clock signal S01 generated as a result of the divider 71a dividing the reference signal S0 output from the reference signal generator 70, and also receives the error amplification signal S32 output from the amplifier circuit 1202.

The first low-pass filter 1203 extracts AC components from the clock signal S01 and also interrupts high-frequency components by using a low-pass filter, thereby generating a sine-wave frequency setting signal S33. The sine-wave frequency setting signal S33 is transmitted to the modulator circuit 1204. The amplitude (p-p value) of the sine-wave frequency setting signal S33 is set by the error amplification signal S32.

The frequency of the sine-wave frequency setting signal S33 is used as the frequency of an AC output voltage Vac (AC output current Iac) output from the transformer 1208. Here-inafter, when reference is not made to the AC output current Iac, only the AC output voltage Vac will be indicated.

The sine-wave frequency setting signal S33 is a signal from which sine wave components are extracted from the clock signal S01 having a duty ratio of 50%. Accordingly, the frequency of the sine-wave frequency setting signal S33 is the frequency of the clock signal S01.

The modulator circuit 1204 receives the sine-wave frequency setting signal S33 transmitted from the first low-pass filter 1203 and the carrier signal S11 having a waveform which is set (converted) by the waveform setting unit 61a by using the received source signal S1. The modulator circuit 1204 then compares the voltage of the sine-wave frequency setting signal S33 with the voltage of the carrier signal S11, and generates a modulation signal S34. The modulation signal S34 is then transmitted to the drive circuit 1205. The voltage of the modulation signal S34 changes depending on whether the voltage of the carrier signal S11 is greater or smaller than the voltage of the sine-wave frequency setting signal S33. The modulation signal S34 is a PWM signal in which the pulse width is determined depending on whether the voltage level of the triangle-wave carrier signal S11 or that of the sine-wave frequency setting signal S33 is greater. This will be discussed later.

The drive circuit 1205 receives the modulation signal S34 from the modulator circuit 1204, and transmits a driving signal S35 to the switch circuit 1206 to drive the switch circuit 1206. The driving signal S35 is also a PWM signal. This will also be discussed later.

The switch circuit 1206 includes two field effect transistors FET1 and FET2 as switching devices (see FIG. 4), which will be discussed later. The driving signal S35 is a PWM signal, and repeatedly turns ON and OFF (switches) the FET1 and FET2 of the switch circuit 1206 alternately. Accordingly, a switch output signal S36 transmitted from the switch circuit 1206 is also PWM signal, as well as the driving signal S35.

The second low-pass filter 1207 interrupts high-frequency components of the switch output signal S36 and thereby generates a sine wave signal S37. The sine wave signal S37 is then transmitted to the transformer 1208.

The transformer 1208 includes a primary winding and a secondary winding. The primary winding receives the sine wave signal S37 transmitted from the second low-pass filter 1207, and the secondary winding outputs the AC output voltage Vac (AC output current Iac) which is set on the basis of the turns ratio (ratio of the number of turns of the secondary winding to that of the primary winding).

Then, the AC output voltage Vac (AC output current Iac) is superposed on a DC output voltage Vdc (DC output current Idc) output from the DC output section 1250, thereby generating an output voltage Vo (output current Io). The output voltage Vo (output current Io) is then applied to the charging roller 13K which charges the photoconductor drum 12K.

The AC current detecting circuit 1209 detects (monitors) the AC output current Iac flowing in the photoconductor drum 12K through the charging roller 13K and converts the AC output current Iac into a DC voltage so that the DC voltage may be proportional to the AC output current Iac, thereby generating the DC voltage detection signal S51. The DC voltage detection signal S51 is then transmitted.

The AC voltage detecting circuit 1210 detects (monitors) the AC output voltage Vac to be applied to the charging roller 13K and converts the AC output voltage Vac into a DC voltage so that the DC voltage may be proportional to the AC output voltage Vac, thereby generating a DC voltage detection signal S52. The DC voltage detection signal S52 is then transmitted.

In FIG. 3, the amplifier circuit 1202 receives the DC voltage detection signal S51 transmitted from the AC current detecting circuit 1209 and performs feedback control (current control) so that the difference between the value set by the AC current setting signal S3 and the AC output current Iac may be decreased. That is, the amplifier circuit 1202 performs feedback control in the following manner. If the AC output current Iac is greater than the value set by the AC current setting signal S3, the AC output voltage Vac is decreased, and if the AC output current Iac is smaller than the value set by the AC current setting signal S3, the AC output voltage Vac is increased.

In the example shown in FIG. 3, the DC voltage detection signal S52 transmitted by the AC voltage detecting circuit 1210 is not received by any component. The amplifier circuit 1202 may receive the DC voltage detection signal S52, as well as the DC voltage detection signal S51 transmitted from the AC current detecting circuit 1209, and may perform control so that the AC output voltage Vac will be decreased if it is greater than a predetermined value.

That is, the DC voltage detection signal S52 transmitted from the AC voltage detecting circuit 1210 may be used for performing overvoltage control. Hereinafter, a description of the AC voltage detecting circuit 1210 will be omitted.

If the developing bias power supply unit 15aK (may be developing bias power supply unit 15aY, 15aM, or 15aC) is used instead of the charging bias power supply unit 13aK, feedback control may desirably be performed on the AC output voltage Vac instead of the AC output current Iac.

That is, in the image forming apparatus 1, concerning the charging bias, it is desirable that a current is maintained at a predetermined value, and concerning the developing bias, it is desirable that a voltage is maintained at a predetermined value.

In this example, the bias power supply apparatus 100 includes the charging bias power supply unit 13aK and the waveform setting unit 61a. The charging bias power supply unit 13aK and the waveform setting unit 61a may be formed on different circuit boards, or they may be formed on a single circuit board. The charging bias power supply unit 13aK may be formed, not on a single circuit board, but on plural circuit boards.

Circuit Configuration of Charging Bias Power Supply Unit 13aK

FIG. 4 illustrates an example of the circuit configuration of the charging bias power supply unit 13aK.

For the sake of easy description, the arrangement of individual blocks in FIG. 4 is different from that in FIG. 3. Additionally, the arrangement of the individual blocks is only schematically shown, and the actual arrangement is not restricted to that shown in FIG. 4.

Moreover, the circuit configuration of the charging bias power supply unit 13aK shown in FIG. 4 is only an example, and the charging bias power supply unit 13aK may have another circuit configuration and may also include another circuit.

FIG. 4 also illustrates an example of individual blocks of the DC output section 1250 and an example of the circuit configurations of these individual blocks.

AC Output Section 1200

The AC output section 1200 will first be discussed.

The analog voltage converter circuit 1201 includes a buffer B1, resistors R1, R2 and R3, and a capacitor C1.

One terminal of the resistor R1 serves as the input terminal of the analog voltage converter circuit 1201, and receives the AC current setting signal S3 from the image output controller 30. The other terminal of the resistor R1 is connected to the input terminal of the buffer B1. The input terminal of the buffer B1 is also connected to one terminal of the resistor R2. The other terminal of the resistor R2 is grounded (ground voltage GND).

The output terminal of the buffer B1 is connected to one terminal of the resistor R3. The other terminal of the resistor R3 serves as the output terminal of the analog voltage converter circuit 1201, and the analog voltage signal S31 is transmitted through this terminal. The other terminal of the resistor R3 is also connected to one terminal of the capacitor C1. The other terminal of the capacitor C1 is grounded.

A reference voltage Vref1 and a ground voltage GND are supplied to the buffer B1.

When the analog voltage converter circuit 1201 receives the AC current setting signal S3, which is a PWM signal, the capacitor C1 is charged to a voltage between the reference voltage Vref and the ground voltage GND. The value of the voltage of the capacitor C1 is determined by the duty ratio of the AC current setting signal S3. Then, the AC current setting signal S3, which is a PWM signal, is converted into the analog voltage signal S31 indicating a DC voltage.

The amplifier circuit 1202 includes an error amplifier Amp1, resistors R4 and R5, and a capacitor C2.

The non-inverting input terminal (hereinafter referred to as the "+ input terminal") of the error amplifier Amp1 is connected to the other terminal of the resistor R3, which serves as the output terminal of the analog voltage converter circuit 1201 and receives the analog voltage signal S31. The inverting terminal (hereinafter referred to as the "− input terminal") is connected to one terminal of the resistor R5. The other terminal of the resistor R5 is connected to the AC current detecting circuit 1209 and receives the DC voltage detection signal S51.

The output terminal of the error amplifier Amp1 is connected to one terminal of the resistor R4. The other terminal of the resistor R4 serves as the output terminal of the amplifier circuit 1202. The error amplifier Amp1 transmits the error amplification signal S32 generated by amplifying the difference between the voltage of the analog voltage signal S31 and the voltage of the DC voltage detection signal S51.

The capacitor C2 connects the − input terminal and the output terminal of the error amplifier Amp1.

The first low-pass filter 1203 includes an error amplifier Amp2, npn transistors Tr1 and Tr2, resistors R6, R7, R8, R9, and R10, a diode D1, and capacitors C3, C4, and C5.

One terminal of the resistor R6 serves as the input terminal of the first low-pass filter 1203, and receives the clock signal S01 obtained as a result of the divider 71a dividing the reference signal S0 generated by the reference signal generator 70 (see FIG. 3). The other terminal of the resistor R6 is connected to the base terminal of the npn transistor Tr1. The emitter terminal of the npn transistor Tr1 is grounded, and the collector terminal thereof is connected to the base terminal of the npn transistor Tr2. The emitter terminal of the npn transistor Tr2 is grounded, and the collector terminal thereof is connected to the cathode terminal of the diode D1. A reference voltage Vref2 is supplied to the collector terminal of the npn transistor Tr1.

One terminal of the resistor R7 is connected to the base terminal of the npn transistor Tr1, and the other terminal thereof is grounded.

The anode terminal of the diode D1 is connected to the other terminal of the resistor R4, which serves as the output terminal of the amplifier circuit 1202, and is also connected to one terminal of the capacitor C3.

The other terminal of the capacitor C3 is connected to one terminal of the resistor R8 and to one terminal of the resistor R9. The other terminal of the resistor R8 is connected to the − input terminal of the error amplifier Amp2 and to one terminal of the capacitor C4. The other terminal of the capacitor C4 is connected to the output terminal of the error amplifier Amp2. The other terminal of the resistor R9 is also connected to the output terminal of the error amplifier Amp2. The output terminal of the error amplifier Amp2 is grounded via the capacitor C5 and the resistor R10. The output terminal of the error amplifier Amp2 also serves as the output terminal of the first low-pass filter 1203 and transmits the sine-wave frequency setting signal S33.

The reference voltage Vref3 is supplied to the + input terminal of the error amplifier Amp2.

The resistors R6 and R7 inhibit an excessive current from flowing through the npn transistor Tr1.

The npn transistor Tr1 serves as an input buffer. The npn transistor Tr2 modulates, together with the diode D1, the error amplification signal S32 by using the clock signal S01.

The capacitor C3 is a coupling capacitor and extracts AC components from the error amplification signal S32 modulated by using the clock signal S01.

The error amplifier Amp2, the resistors R8, R9, and R10, and the capacitors C4 and C5, which form a low-pass filter, interrupt high-frequency components and thereby generate the sine-wave frequency setting signal S33. The sine-wave frequency setting signal S33 is then transmitted to the modulator circuit 1204.

The amplitude (p-p value) of the sine-wave frequency setting signal S33 is set by the error amplification signal S32, which will be discussed later.

A voltage generating circuit 1211, which is not shown in FIG. 3, will be discussed below. The voltage generating circuit 1211 supplies a power supply voltage Vs (e.g., 24 V) to the modulator circuit 1204, the drive circuit 1205, the switch circuit 1206, and the second low-pass filter 1207. The power supply voltage Vs is different from a voltage used for logic levels (a voltage used as a high level ("hereinafter indicated by "H"), e.g., 5 V, of signals (taking two values, "H" and a low level ("hereinafter indicated by "L") shown in FIGS. 6, 7, 8, and 9).

Accordingly, the voltage generating circuit 1211 is provided for generating the power supply voltage Vs.

The modulator circuit 1204 will now be discussed below.

The modulator circuit 1204 includes a comparator Cmp. The + input terminal of the comparator Cmp receives the carrier signal S11. The − input terminal of the comparator Cmp is connected to the output terminal of the first low-pass filter 1203 and receives the sine-wave frequency setting signal S33. The output terminal of the comparator Cmp is connected to the drive circuit 1205.

The comparator Cmp compares the voltage of the sine-wave frequency setting signal S33 with the voltage of the carrier signal S11 and thereby generates the following modulation signal S34. When the voltage of the carrier signal S11 is greater than that of the sine-wave frequency setting signal S33, the voltage of the modulation signal S34 indicates the power supply voltage Vs. When the voltage of the carrier signal S11 is smaller than that of the sine-wave frequency setting signal S33, the voltage of the modulation signal S34 indicates the ground voltage GND. The generated modulation signal S34 is transmitted to the drive circuit 1205. The modulation signal S34 is a PWM signal in which the pulse width is determined depending on whether the voltage level of the triangle-wave carrier signal S11 or that of the sine-wave frequency setting signal S33 is greater.

The drive circuit 1205 includes a pnp transistor Tr3, an npn transistor Tr4, and a resistor R11.

One terminal of the resistor R11, which serves as an input terminal of the drive circuit 1205, is connected to the output terminal of the comparator Cmp of the modulator circuit 1204, and receives the modulation signal S34. The other terminal of the resistor R11 is connected to both the base terminal of the pnp transistor Tr3 and the base terminal of the npn transistor Tr4. The collector terminal of the pnp transistor Tr3 is grounded, and the collector terminal of the npn transistor Tr4 is set to be the power supply voltage Ts. The emitter terminal of the pnp transistor Tr3 and the emitter terminal of the npn transistor Tr4 are connected to each other, and serve as the output terminal of the drive circuit 1205. The driving signal S35 is transmitted through this output terminal. The resistor R11 inhibits an excessive current from flowing through the pnp transistor Tr3 and the npn transistor Tr4.

When the modulation signal S34 indicates the ground voltage GND, the pnp transistor Tr3 is ON and the npn transistor Tr4 is OFF, and thus, the driving signal S35 is set to be the ground voltage GND. When the modulation signal S34 indicates the power supply voltage Vs, the pnp transistor Tr3 is OFF and the npn transistor Tr4 is ON, and thus, the driving signal S35 is set to be the power supply voltage Vs.

That is, the driving signal S35 is a PWM signal having the same voltage levels as those of the modulation signal S34. The drive circuit 1205 serves as a buffer for supplying a drive current to the switch circuit 1206.

The switch circuit 1206 includes an n-channel FET1, a p-channel FET2, and resistors R12 and R13.

One terminal of the resistor R12 and one terminal of the resistor R13 are connected to each other and serve as the input terminal of the switch circuit 1206. The input terminal of the switch circuit 1206 is connected to the output terminal of the drive circuit 1205 (the emitter terminals of the pnp transistor Tr3 and the npn transistor Tr4) and receives the driving signal S35. The other terminal of the resistor R12 is connected to the gate terminal of the FET1, while the other terminal of the resistor R13 is connected to the gate terminal of the FET2. The source terminal of the FET1 is grounded, while the source terminal of the FET2 is set to be the power supply voltage Vs. The drain terminal of the FET1 and the drain terminal of the FET2 are connected to each other, and serve as the output terminal of the switch circuit 1206. The switch output signal S36 is transmitted through this output terminal.

When the driving signal S35 indicates the ground voltage GND, the FET1 is OFF and the FET2 is ON, and thus, the switch output signal S36 of the switch circuit 1206 is set to be the power supply voltage Vs. When the driving signal S35 indicates the power supply voltage Vs, the FET1 is ON and the FET2 is OFF, and thus, the switch output signal S36 of the switch circuit 1206 is set to be the ground voltage GND. That is, the switch output signal S36 is a PWM signal having voltage levels opposite to those of the driving signal S35.

The second low-pass filter 1207 includes an inductance L, resistors R14 and R15, and capacitors C6, C7, and C8.

One terminal of the inductance L is connected to the output terminal of the switch circuit 1206 and receives the switch output signal S36. The other terminal of the inductance L is connected to one terminal (first terminal) of the primary winding of the transformer 1208. The resistors R14 and R15 are connected in series with each other between the power supply voltage Vs and a ground voltage GND. The midpoint (node) between the resistors R14 and R15 is connected to the other terminal (second terminal) of the primary winding of the transformer 1208.

The capacitor C8 is connected between the first and second terminals of the primary winding of the transformer 1208.

The inductance L and the capacitor C8 form an LC circuit, thereby forming a low-pass filter.

One terminal of the capacitor C7 is connected to the node between the resistors R14 and R15, and the other terminal of the capacitor C7 is grounded. The capacitor C7 inhibits the fluctuation of the voltage of the second terminal of the primary winding of the transformer 1208.

The capacitor C6 is disposed between the power supply voltage Vs and a ground voltage GND, and inhibits the fluctuation of the power supply voltage Vs.

The second low-pass filter 1207 extracts sine waves from the switch output signal S36, which is a PWM signal, and thereby generates the sine wave signal S37. The sine wave signal S37 is transmitted to the transformer 1208.

The transformer 1208 includes the above-described primary winding and a secondary winding. The primary winding is connected to the second low-pass filter 1207.

The capacitor C9 is connected between one terminal (first terminal) and the other terminal (second terminal) of the secondary winding. The first terminal of the secondary winding is connected to the charging roller 13K via a resistor R26. The second terminal of the secondary winding is connected to the DC output section 1250. With this arrangement, the output voltage Vo (output current Io) obtained by superposing the AC output voltage Vac (AC output current Iac) output from the AC output section 1200 on the DC output voltage Vdc (DC output current Idc) output from the DC output section 1250 is applied to the charging roller 13K.

The AC current detecting circuit 1209 includes diodes D2 and D3, a resistor R15, and capacitors C10 and C11.

One terminal of the capacitor C10 serves as the input terminal of the AC current detecting circuit 1209 and is connected to the second terminal of the secondary winding of the transformer 1208. The other terminal of the capacitor C10 is connected to the cathode terminal of the diode D2 and to the anode terminal of the diode D3. The anode terminal of the diode D2 is grounded. The cathode terminal of the diode D3 is connected to both one terminal of the resistor R15 and one terminal of the capacitor C11. The other terminal of the resistor R15 and the other terminal of the capacitor C11 are grounded.

The cathode terminal of the diode D3, which serves as the output terminal of the AC current detecting circuit 1209, is connected to the − input terminal of the error amplifier Amp1 of the amplifier circuit 1202 via the resistor R5, and transmits the DC voltage detection signal S51 to the amplifier circuit 1202.

The AC output current Iac, which is used for charging the photoconductor drum 12K via the charging roller 13K, is input into the diode D3 via the capacitor C10 and is rectified. The AC output current Iac is then converted into a voltage by the voltage R15. This voltage is used as the DC voltage detection signal S51.

DC Output Section 1250

The DC output section 1250, which is not shown in FIG. 3, includes, as shown in FIG. 4, an analog voltage converter circuit 1251, an amplifier circuit 1252, a control circuit 1253, a switch circuit 1254, a transformer 1255, a rectifier circuit 1256, and a DC voltage detecting circuit 1257.

The above-described circuits will be individually discussed below.

The analog voltage converter circuit 1251 receives a DC voltage setting signal S4 sent from the image output controller 30. As in the AC current setting signal S3, the DC voltage setting signal S4 is a PWM signal and determines the value of the DC output voltage Vdc output from the rectifier circuit 1256 in accordance with the duty ratio.

The analog voltage converter circuit 1251 has a circuit configuration similar to that of the analog voltage converter circuit 1201 of the AC output section 1200. More specifically, the analog voltage converter circuit 1251 includes a buffer B2, resistors R16, R17, and R18, and a capacitor C12.

One terminal of the resistor R16 serves as the input terminal of the analog voltage converter circuit 1251 and receives the DC voltage setting signal S4. The other terminal of the resistor R16 is connected to the input terminal of the buffer B2. The input terminal of the buffer B2 is connected to one terminal of the resistor R17. The other terminal of the resistor R17 is grounded.

The output terminal of the buffer B2 is connected to one terminal of the resistor R18. The other terminal of the resistor R18 serves as the output terminal of the analog voltage converter circuit 1251. An analog voltage signal S41 is transmitted through this terminal. The other terminal of the resistor R18 is also connected to one terminal of the capacitor C12. The other terminal of the capacitor C12 is grounded.

A reference voltage Vref5 and a ground voltage GND are supplied to the buffer B2.

When the analog voltage converter circuit 1251 receives the DC voltage setting signal S4, which is a PWM signal, the capacitor C12 is charged to a voltage between the reference voltage Vref5 and the ground voltage GND. The value of the voltage of the capacitor C12 is determined by the duty ratio of the DC voltage setting signal S4. Then, the DC voltage setting signal S4, which is a PWM signal, is converted into the analog voltage signal S41 indicating a DC voltage.

The amplifier circuit 1252 includes an error amplifier Amp3, resistors R19, R20, R21, and R22, and a capacitor C13.

One terminal of the resistor R19 serves as the input terminal of the amplifier circuit 1252, and receives the analog voltage signal S41 from the analog voltage converter circuit 1251. The other terminal of the resistor R19 is connected to the − input terminal of the error amplifier Amp3. The + input terminal of the error amplifier Amp3 is connected to the DC voltage detecting circuit 1257 via the resistor R21 and receives a detection signal S42.

The resistor R20 and the capacitor C13 are connected in series with each other, and the terminal of the resistor R20 which is not connected to the capacitor C13 is connected to the − input terminal of the error amplifier Amp3. The terminal of the capacitor C13 which is not connected to the resistor R20 is connected to the output terminal of the error amplifier Amp3.

The output terminal of the error amplifier Amp3 is connected to one terminal of the resistor R22. The other terminal of the resistor R22 serves as the output terminal of the amplifier circuit 1252. An error amplification signal S43 obtained as a result of the error amplifier Amp3 amplifying the difference between the analog voltage signal S41 and the detection signal S42 is transmitted through this terminal.

The control circuit 1253 transmits a driving signal S44 for turning ON an npn transistor Tr5, which is a switching device of the switch circuit 1254, on the basis of the error amplification signal S43.

The switch circuit 1254 includes the npn transistor Tr5, which serves as a switching device. The base terminal of the npn transistor Tr5 is connected to the control circuit 1253 and receives the driving signal S44. The base terminal and the collector terminal of the npn transistor Tr5 are connected to the transformer 1255. The emitter terminal of the npn transistor Tr5 is grounded.

The operation of the npn transistor Tr5 will be discussed later, together with the operation of the transformer 1255.

The transformer 1255 includes a primary winding, a primary auxiliary winding, and a secondary winding. One terminal of the primary winding is set to be the power supply voltage Vs, and the other terminal thereof is connected to the collector terminal of the npn transistor Tr5. One terminal of the primary auxiliary winding is connected to both the base terminal of the npn transistor Tr5 of the switch circuit 1254 and the control circuit 1253. The other terminal of the primary auxiliary winding is grounded.

Both terminals of the secondary winding of the transformer 1255 are connected to the rectifier circuit 1256.

The rectifier circuit 1256 includes a diode D4, a resistor R23, and a capacitor C14. The cathode terminal of the diode D4 is connected to one terminal of the secondary winding of the transformer 1255, and the anode terminal thereof is connected to one terminal of the resistor R23 and to one terminal of the capacitor C14. The other terminal of the resistor R23 serves as the output terminal of the rectifier circuit 1256, and is also connected to the second terminal of the secondary winding of the transformer 1208 of the AC output section 1200. The other terminal of the capacitor C14 is connected to the other terminal of the secondary winding of the transformer 1255.

The rectifier circuit 1256 converts a voltage induced in the secondary winding of the transformer 1255 into a negative (−) DC output voltage Vdc (DC output current Idc).

The DC voltage detecting circuit 1257 includes resistors R24 and R25 and a capacitor C15.

The resistor R25 and the capacitor C15 are connected in parallel with each other. One terminal of a parallel circuit constituted by the resistor R25 and the capacitor 15 is connected to the other terminal of the resistor R23, which serves as the output terminal of the rectifier circuit 1256, via the resistor R24. The other terminal of the parallel circuit is connected to the other terminal of the capacitor C14 of the rectifier circuit 1256 and is set to be a reference voltage Vref6.

The reference voltage Vref6 is used for preventing the voltage of the + input terminal of the error amplifier Amp3 of the amplifier circuit 1252 from becoming negative.

The DC output voltage Vdc is divided by the resistors R24 and R25. Accordingly, the DC voltage detecting circuit 1257 detects (monitors) a voltage appearing at the resistor R25 and transmits the detection signal S42 proportional to the DC output voltage Vdc. The + input terminal of the error amplifier Amp3 of the amplifier circuit 1252 receives the detection signal S42 via the resistor R21.

The operation of the DC output section 1250 will be described below.

The switch circuit 1254 receives the positive (+) driving signal S44 for turning ON the npn transistor Tr5 from the control circuit 1253, thereby turning ON the npn transistor Tr5. Then, a current flows between the collector terminal and the emitter terminal of the npn transistor Tr5 via the primary winding of the transformer 1255.

A current flows through the primary winding of the transformer 1255, and as a result, a voltage for increasing the voltage of the base terminal of the npn transistor Tr5 is generated in the primary auxiliary winding. Then, a collector current of the npn transistor Tr5 increases over time.

A voltage is also generated in the secondary winding. However, since the direction of the diode D4 is reverse to the direction of the voltage, a current does not flow through the secondary winding.

The amplification factor of the npn transistor Tr5 is finite. Accordingly, once the collector current reaches a certain value, it does not increase any more, and the magnetic flux of the core of the primary winding stops changing. Then, a force acts on the primary winding such as to cause a current to flow in the same direction as the direction in which the current was flowing in the primary winding, thereby generating a voltage in the primary winding in the direction reverse to the direction of the voltage which was generated in the primary auxiliary winding. Accordingly, a voltage is generated in the secondary winding in the same direction as that of the diode D4, thereby causing a current to flow through the secondary winding.

Due to the generation of the reverse direction voltage in the primary winding, a reverse direction voltage is also generated in the primary auxiliary winding, and a reverse bias is applied between the base terminal and the emitter terminal of the npn transistor Tr5, thereby turning OFF the npn transistor Tr5.

When the current flowing through the diode D4 reaches 0, the voltages generated in the primary winding, the primary auxiliary winding, and the secondary winding become 0 V. Then, upon receiving the driving signal S44 from the control circuit 1253, the voltage between the base terminal and the emitter terminal of the npn transistor Tr5 shifts to a positive (+) side again, thereby turning ON the npn transistor Tr5.

In this manner, by switching (turning ON and OFF) the npn transistor Tr5, the DC output voltage Vdc is generated due to a current flowing through the secondary winding during a period for which the npn transistor Tr5 is OFF.

Source Signal Generator 60*a* and Waveform Setting Unit 61*a*

A description will now be given of the source signal generator 60*a* which generates the source signal S1 and the waveform setting unit 61*a* which sets the waveform of the carrier signal S11.

Figure 5:
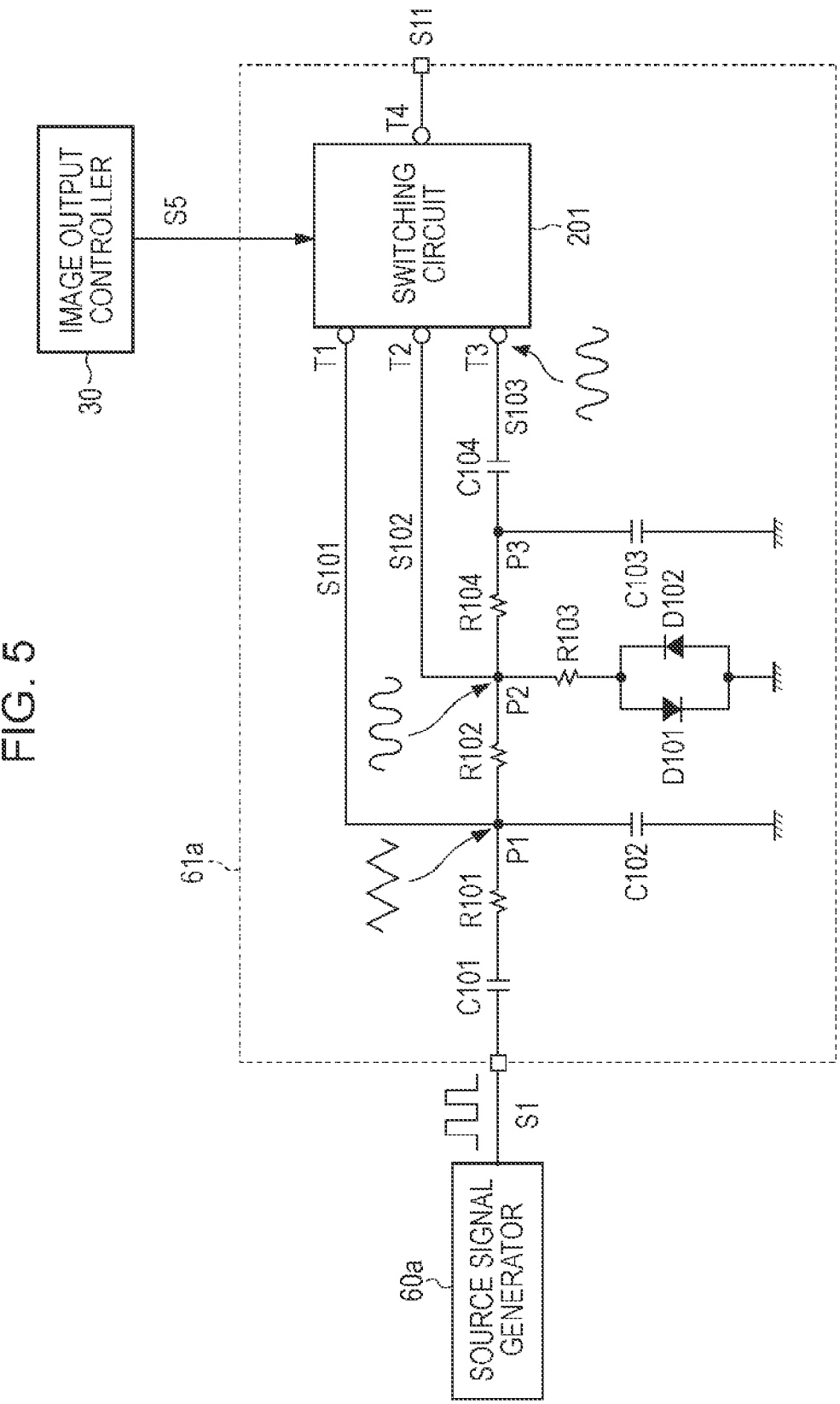
FIG. 5 illustrates an example of a source signal generator and an example of a waveform setting unit according to the first exemplary embodiment.

FIG. 5 illustrates an example of the source signal generator 60*a* and an example of the waveform setting unit 61*a* according to the first exemplary embodiment.

In the first exemplary embodiment, the source signal generator 60*a* generates a square wave having a predetermined frequency.

The waveform setting unit 61*a* may extract plural waveforms on the basis of a square waveform generated by the source signal generator 60*a*. In other words, the waveform setting unit 61*a* may convert a square wave into plural waveforms. The waveform setting unit 61*a* shown in FIG. 5 may extract a triangle wave, a pseudo sine wave, and a sine wave. The pseudo sine wave is similar to the sine wave, but contains higher harmonics in addition to fundamental waves.

The waveform setting unit 61*a* includes resistors R101, R102, R103, and R104, capacitors C101, C102, C103, and C104, diodes D101 and D102, and a switching circuit 201.

The capacitor C101 and the resistor R101 are connected in series with each other. The terminal of the capacitor C101 which is not connected to the resistor R101 serves as the input terminal of the waveform setting unit 61*a* and receives the source signal S1 from the source signal generator 60*a*.

The terminal of the resistor R101 which is not connected to the capacitor C101 is connected to one terminal of the capacitor C102 (node P1). The other terminal of the capacitor C102 is grounded.

The node P1 is connected to the switching circuit 201 (terminal T1, which will be discussed later).

The node P1 is connected to one terminal of the resistor R102. The other terminal of the resistor R102 is connected to one terminal of the resistor R103 (node P2). The other terminal of the resistor R103 is connected to the anode terminal of the diode D101 and the cathode terminal of the diode D102. The cathode terminal of the diode D101 and the anode terminal of the diode D102 are grounded.

The node P2 is connected to the switching circuit 201 (terminal T2, which will be discussed later).

The node P2 is connected to one terminal of the resistor R104. The other terminal of the resistor R104 is connected to one terminal of the capacitor C103 (node P3). The other terminal of the capacitor C103 is grounded.

The other terminal of the capacitor C104 is connected to the switching circuit 201 (terminal T3, which will be discussed later).

The switching circuit 201 includes terminals T1, T2, T3, and T4. The terminal T1 is connected to the node P1, the terminal T2 is connected to the node P2, and the terminal T3 is connected to the node P3 with the capacitor C104 therebetween. Upon receiving a setting signal S5 from the image output controller 30, the switching circuit 201 causes one of the terminals T1, T2, and T3 to be connected to the terminal T4. The terminal T4 serves as the output terminal of the waveform setting unit 61a, and the carrier signal S11 is transmitted through the terminal T4.

The switching circuit 201 may be a switch constituted by a bipolar transistor or a metal oxide semiconductor (MOS) transistor, or it may be a switch which is changed between the nodes by a motor. Alternatively, the switching circuit 201 may be a switch which is short-circuited (connected) by a conductor inserted between the terminals (between one of the terminals T1, T2, and T3 and the terminal T4).

The operation of the waveform setting unit 61a will be described below, assuming that the source signal generator 60a transmits the square-wave source signal S1 having a duty ratio of 50%.

In the waveform setting unit 61a, upon receiving the square-wave source signal S1 transmitted from the source signal generator 60a, the capacitor C101 cuts DC components and allows AC components to pass through the capacitor C101. Then, a waveform having frequency components equal to or lower than the frequency determined by a low-pass filter constituted by the resistor R101 and the capacitor C102 appears at the node P1. In this case, the values of the capacitors C101 and C102 and the resistor R101 are adjusted so that a triangle wave may be obtained at the node P1 (terminal T1 of the switching circuit 201). That is, when the switching circuit 201 connects the terminal T1 and the terminal T4, the waveform of the carrier signal S11 becomes a triangle wave. The repetition frequency (frequency) of the triangle wave is equal to the frequency of the source signal S1.

Then, the triangle wave obtained at the node P1 reaches the node P2 through the resistor R102. Then, high frequency components are lost by the diodes D101 and D102 and the resistor R103 connected to the node P2. In this case, a waveform (pseudo sine wave) similar to a sine wave is obtained at the node P2 (terminal T2) by the resistor R103 and the diodes D101 and D102. That is, when the switching circuit 201 connects the terminal T2 and the terminal T4, the waveform of the carrier signal S11 becomes a pseudo sine wave. The repetition frequency (frequency) of the pseudo sine wave is equal to the frequency of the source signal S1.

Then, the pseudo sine wave obtained at the node P2 reaches the node P3 through the resistor R104 connected to the node P2. Then, high frequency components are lost by a low-pass filter constituted by the resistor R104 and the capacitor C103 connected to the node P3. Then, the pseudo sine wave from which high-frequency components are eliminated reaches the terminal T3 through the capacitor C104.

In this case, a sine wave is obtained at the terminal T3 by the resistor R104 and the capacitors C103 and C104. That is, when the switching circuit 201 connects the terminal T3 and the terminal T4, the waveform of the carrier signal S11 becomes a sine wave. The repetition frequency (frequency) of the sine wave is equal to the frequency of the source signal S1.

Thus, the waveform setting unit 61a sets a triangle wave, a pseudo sine wave, and a sine wave, on the basis of the source signal S1, which is a square wave, received from the source signal generator 60a. In other words, the waveform setting unit 61a converts the square-wave source signal S1 into a triangle wave, a pseudo sine wave, and a sine wave. Then, by switching the connection between the terminals (between one of the terminals T1, T2, and T3 and the terminal T4) by using the switching circuit 201, one of the triangle wave, the pseudo sine wave, and the sine wave is transmitted as the carrier signal S11.

It is assumed that, in the waveform setting unit 61a, voltages are adjusted so that the lowest voltage of the carrier signal S11 may be the ground voltage GND and the highest voltage of the carrier signal S11 may be 3 V.

In the example shown in FIG. 5, the waveform of the carrier signal S11 is one of a triangle wave, a pseudo sine wave, and a sine wave. However, the carrier signal S11 may be another type of waveform, as long as the modulation signal S34, which is a PWM signal, can be generated by comparing the voltage of the carrier signal S11 with the voltage of the sine-wave frequency setting signal S33, which is input into the − input terminal of the comparator Cmp of the modulator circuit 1204 shown in FIG. 4.

The source signal S1 transmitted from the source signal generator 60a does not have to be a square wave having a duty ratio of 50%. Instead, the source signal S1 may be any type of waveform as long as plural waveforms can be obtained in the waveform setting unit 61a.

The circuit configuration of the waveform setting unit 61a shown in FIG. 5 is only an example, and may be another circuit configuration. The waveform setting unit 61a may include another circuit.

In the example shown in FIG. 5, the connection (switching) between one of the terminals T1, T2, and T3 and the terminal T4 in the switching circuit 201 of the waveform setting unit 61a is performed on the basis of the setting signal S5 input from the image output controller 30. However, the connection between the terminals may be performed on the basis of a signal input from another control circuit. Alternatively, a user or a maintenance operator may connect between one of the terminals T1, T2, and T3 and the terminal T4.

Operation of Charging Bias Power Supply Unit 13aK

The operation of the charging bias power supply unit 13aK will now be discussed below.

Figure 6:
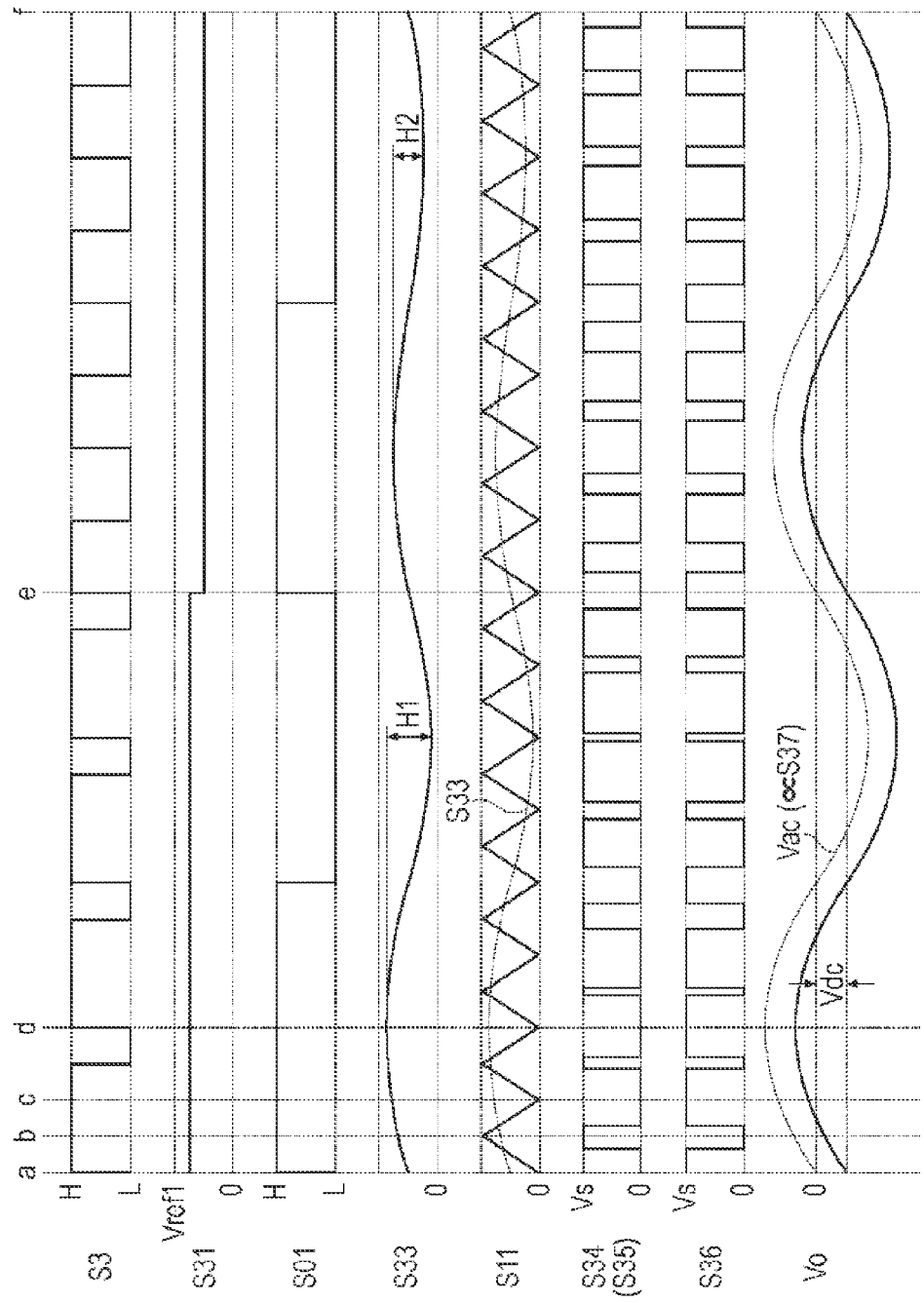
FIG. 6 is a timing chart illustrating the operation of a charging bias power supply unit when the waveform of a carrier signal used in the first exemplary embodiment is a triangle wave.

FIG. 6 is a timing chart illustrating the operation of the charging bias power supply unit 13aK when the waveform of the carrier signal S11 used in the first exemplary embodiment is a triangle wave. In FIG. 6, the AC current setting signal S3, the analog voltage signal S31, the clock signal S01, the sine-wave frequency setting signal S33, the carrier signal S11, the modulation signal S34, the switch output signal S36, and the output voltage Vo are shown. The waveform of the carrier signal S11 is a triangle wave which is set in the waveform setting unit 61a.

In FIG. 6, the time elapses in alphabetical order, such as time a, time b, time c, and so on.

The AC current setting signal S3 is transmitted from the image output controller 30 to the charging bias power supply unit 13aK. The AC current setting signal S3 takes two values, i.e., "H" and "L", and is a PWM signal which is set at a predetermined ratio (duty ratio) of the "H" duration to the "L" duration in each period of the AC current setting signal S3. For example, "L" is a ground voltage GND (0 V), and "H" is 5 V. The value of the AC output current Iac is set by the duty ratio.

In FIG. 6, the duration from time a to time d is set as the period of the AC current setting signal S3. The duty ratio of the AC current setting signal S3 is 75% in the periods from time a to time e, and is 50% in the periods from time e to time f.

The analog voltage signal S31 is generated by the analog voltage converter circuit 1201 upon receiving the AC current setting signal S3. As shown in FIG. 4, the capacitor C1 is charged by the AC current setting signal S3, thereby causing the analog voltage converter circuit 1201 to generate the analog voltage signal S31.

More specifically, the analog voltage signal S31 is set to be a voltage of 75% of the reference voltage Vref1 in the periods from time a to time e in which the duty ratio of the AC current setting signal S3 is 75%, and to be a voltage of 50% of the reference voltage Vref1 in the periods from time e to time f in which the duty ratio of the AC current setting signal S3 is 50%. That is, the voltage of the analog voltage signal S31 is determined in accordance with the duty ratio of the AC current setting signal S3.

The clock signal S01 is a signal obtained as a result of the divider 71a dividing the reference signal S0 generated by the reference signal generator 70. The clock signal S01 takes two values, i.e., "H" and "L", and is a signal having a duty ratio of 50%. The repetition frequency of the clock signal S01 is equal to the frequency of the AC output voltage Vac (AC output current Iac). In this example, the frequency of the clock signal S01 is ⅛ the frequency of the carrier signal S11, which will be discussed later.

As shown in FIG. 4, the clock signal S01 is input into the base terminal of the npn transistor Tr1 of the first low-pass filter 1203. The npn transistor Tr1 is ON while the clock signal S01 is "H", and the collector terminal of the npn transistor Tr1 is set to be a ground voltage GND. The npn transistor Tr1 is OFF while the clock signal S01 is "L", and the collector terminal of the npn transistor Tr1 is set to be the reference voltage Vref2. In this example, the reference voltage Vref2 is a positive voltage, for example, 5 V.

The collector terminal of the npn transistor Tr1 is connected to the base terminal of the npn transistor Tr2. Accordingly, while the collector terminal of the npn transistor Tr1 is maintained at the reference voltage Vref2 (while the clock signal S01 is "L"), the npn transistor Tr2 is ON, and the collector terminal of the npn transistor Tr2 is set to be a ground voltage GND. On the other hand, while the collector terminal of the npn transistor Tr1 is maintained at the ground voltage GND (while the clock signal S01 is "H"), the npn transistor Tr2 is OFF, and the collector terminal of the npn transistor Tr2 is set to be in the floating state.

The error amplification signal S32 output from the amplifier circuit 1202 is a signal obtained as a result of the error amplifier Amp1 amplifying the difference voltage between the voltage of the analog voltage signal S31 and the voltage of the detection signal S51 output from the AC current detecting circuit 1209. That is, the error amplification signal S32 is a signal corresponding to (proportional to) the analog voltage signal S31.

The error amplification signal S32 is input into the first low-pass filter 1203 and is modulated by the diode D1. While the collector terminal of the npn transistor Tr2 is maintained at the ground voltage GND (while the clock signal S01 is "L"), the diode D1 is forward-biased, and the error amplification signal S32 is dropped to the ground voltage GND. On the other hand, while the collector terminal of the npn transistor Tr2 is in the floating state (while the clock signal S01 is "H"), the diode D1 is not forward-biased, and the error amplification signal S32 is maintained at the same value. That is, the error amplification signal S32 is modulated by the clock signal S01 when being input into the first low-pass filter 1203.

Then, after the error amplification signal S32 modulated by the clock signal S01 passes through a low-pass filter constituted by the error amplifier Amp2, etc. of the first low-pass filter 1203, it is converted into the frequency setting signal S33, which is a sine wave.

As shown in FIG. 6, the amplitude (p-p value) of the sine-wave frequency setting signal S33 is set by the analog voltage signal S31 (i.e., the AC current setting signal S3 shown in FIG. 6). That is, the amplitude H1 in the periods from time a to time e in which the duty ratio of the AC current setting signal S3 is 75% is greater than the amplitude H2 in the periods from time e to time f in which the duty ratio of the AC current setting signal S3 is 50% by a factor of 1.25 (75/50=1.25).

In this example, it is assumed that the amplitudes H1 and H2 of the sine-wave frequency setting signal S33 are not influenced by the detection signal S51 output from the AC current detecting circuit 1209.

In FIG. 6, the waveform of the carrier signal S11 is a triangle wave. That is, the carrier signal S11 is a triangle wave in which the duration from time a to time c is set as the period of the carrier signal S11. The duration from time a to time b corresponds to the rising edge of the triangle wave, and the duration from time b to time c corresponds to the falling edge of the triangle wave. In FIG. 6, the rising time and the falling time of the triangle wave are the same.

In FIG. 6, the frequency of the AC current setting signal S3 is ½ the frequency of the carrier signal S11. However, the frequency of the AC current setting signal S3 may be even lower than that shown in FIG. 6. The relationship between the frequency of the AC current setting signal S3 and the frequency of the carrier signal S11 does not have to be expressed by the ratio of whole numbers.

As stated above, the comparator Cmp of the modulator circuit 1204 compares the voltage of the sine-wave frequency setting signal S33 with the voltage of the carrier signal S11, which is a triangle wave, and thereby generates the following modulation signal S34. When the voltage of the carrier signal S11 is greater than that of the sine-wave frequency setting signal S33, the voltage of the modulation signal S34 indicates the power supply voltage Vs. When the voltage of the carrier signal S11 is smaller than that of the sine-wave frequency setting signal S33, the voltage of the modulation signal S34 indicates the ground voltage GND. The generated modulation signal S34 is then transmitted.

In FIG. 6, the sine-wave frequency setting signal S33 is indicated by the broken line on the triangle-wave carrier signal S11. The modulation signal S34 is a PWM signal in which the pulse width is determined depending on whether the voltage level of the triangle-wave carrier signal S11 or that of the sine-wave frequency setting signal S33 is greater.

As shown in FIG. 4, the FET1 and the FET2 of the switch circuit 1206 are alternately turned ON and OFF by the driving signal S35 having the same voltage levels as those of the modulation signal S34 (in FIG. 6, indicated by "S34 (S35)"). As stated above, when the modulation signal S34 (driving signal S35) indicates the ground voltage GND, the FET1 is OFF and the FET2 is ON, and thus, the switch output signal S36 output from the switch circuit 1206 is set to be the power supply voltage Vs. When the modulation signal S34 (driving signal S35) indicates the power supply voltage Vs, the FET1 is ON and the FET2 is OFF, and thus, the switch output signal S36 output from the switch circuit 1206 is set to be the ground voltage GND. That is, the voltage levels of the modulation signal S34 (driving signal S35) are opposite to those of the switch output signal S36.

The second low-pass filter 1207 extracts the sine wave signal S37 from the switch output signal S36 output from the switch circuit 1206. Then, the sine wave signal S37 is converted into the AC output voltage Vac via the transformer 1208. Since the AC output voltage Vac is proportional to the sine wave signal S37, it is indicated by Vac (∝S37) in FIG. 6.

The DC output section 1250 is operated similarly to the AC output section 1200. As shown in FIG. 4, the analog voltage converter circuit 1251 generates the analog voltage signal S41 in which the voltage level is set by the duty ratio of the DC voltage setting signal S4. The analog voltage signal S41 is then transmitted to the amplifier circuit 1252. The amplifier circuit 1252 amplifies the difference between the voltage of the analog voltage signal S41 and the voltage of the detection signal S42 output from the DC voltage detecting circuit 1257 and thereby generates the error amplification signal S43. The error amplification signal S43 is then transmitted to the control circuit 1253. The control circuit 1253 generates a voltage for turning ON the npn transistor Tr5 of the switch circuit 1254. Then, as stated above, by repeatedly turning ON and OFF (switching) the npn transistor Tr5 of the switch circuit 1254, a voltage is induced in the secondary winding of the transformer 1255.

The rectifier circuit 1256 rectifies the induced voltage and outputs the DC output voltage Vdc.

Then, the output voltage Vo obtained by superposing the AC output voltage Vac on the DC output voltage Vdc is output from the charging bias power supply unit 13aK and is applied to the charging roller 13K. Then, the AC output current Iac flows, together with the DC output current Idc, through the photoconductor drum 12K via the charging roller 13K.

As stated above, if the DC output voltage Vdc is −600 V, and if the AC output voltage Vac has a p-p value of 2 kV at a frequency of 2 kHz, the output voltage Vo turns out to be a voltage which alternately takes the positive and negative values about the ground voltage GND (0 V), as shown in FIG. 6.

As shown in FIG. 4, the AC current detecting circuit 1209 detects (monitors) the AC output current Iac and converts the AC output current Iac into a DC voltage, thereby generates the DC voltage detection signal S51. The DC voltage detection signal S51 is then transmitted to the amplifier circuit 1202, and is received by the −input terminal of the error amplifier Amp1 of the amplifier circuit 1202 via the resistor R5. Then, the error amplifier Amp1 amplifies the difference between the voltage of the analog voltage signal S31 received by the + input terminal and the voltage of the detection signal S51 received by the − input terminal, thereby controlling the amplitude of the sine-wave frequency setting signal S33.

Meanwhile, the DC voltage detecting circuit 1257 detects (monitors) the DC output voltage Vdc and transmits the detection signal S42 proportional to the DC output voltage Vdc. The + input terminal of the error amplifier Amp3 of the amplifier circuit 1252 receives the detection signal S42 via the resistor R21. Then, the error amplifier Amp3 amplifies the difference between the voltage of the detection signal S42 received by the + input terminal and the voltage of the analog voltage signal S41 received by the − input terminal, thereby controlling the value of the DC output voltage Vdc.

The charging bias power supply unit 13aK is operated as described above.

Figure 7:
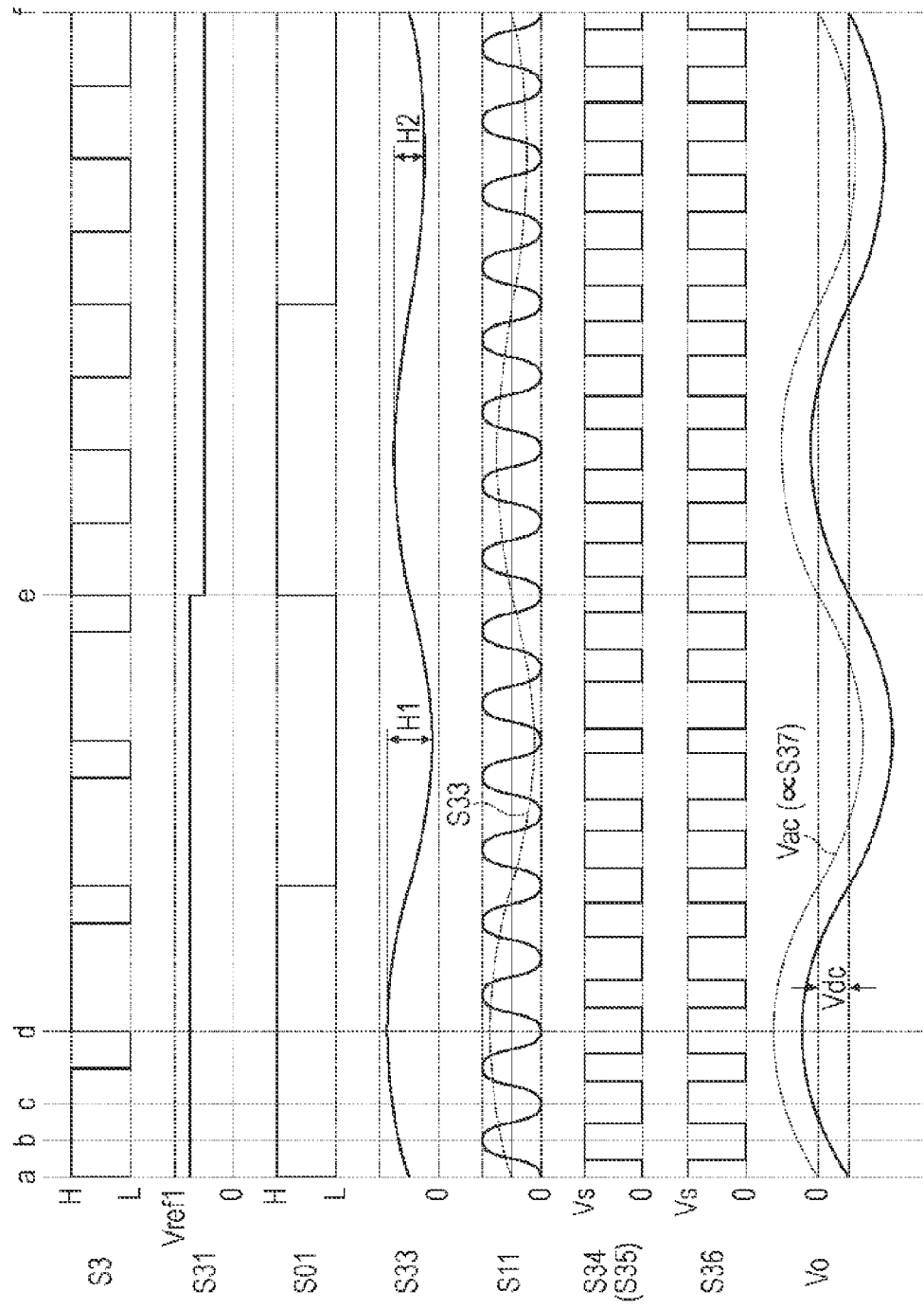
FIG. 7 is a timing chart illustrating the operation of a charging bias power supply unit when the waveform of a carrier signal used in the first exemplary embodiment is a pseudo sine wave.

FIG. 7 is a timing chart illustrating the operation of the charging bias power supply unit 13aK when the waveform of the carrier signal S11 used in the first exemplary embodiment is a pseudo sine wave. As in FIG. 6, in FIG. 7, the AC current setting signal S3, the analog voltage signal S31, the clock signal S01, the sine-wave frequency setting signal S33, the carrier signal S11, the modulation signal S34, the switch output signal S36, and the output voltage Vo are shown. The waveform of the carrier signal S11 is a pseudo sine wave which is set in the waveform setting unit 61a.

As in FIG. 6, in FIG. 7, the time elapses in alphabetical order, such as time a, time b, time c, and so on. A description of the same portions as those of FIG. 6 will be omitted, and only portions different from those of FIG. 6 will be discussed below.

The AC current setting signal S3, the analog voltage signal S31, the clock signal S01, and the sine-wave frequency setting signal S33 shown in FIG. 7 are the same as those shown in FIG. 6.

In FIG. 7, the waveform of the carrier signal S11 is a pseudo sine wave. That is, the carrier signal S11 is a pseudo sine wave in which the duration from time a to time c is set as the period of the carrier signal S11.

As stated above, the comparator Cmp of the modulator circuit 1204 compares the voltage of the sine-wave frequency setting signal S33 with the voltage of the pseudo-sine-wave carrier signal S11 and thereby generates the modulation signal S34 (driving signal S35), which is a PWM signal.

FIG. 7 shows that the comparator Cmp of the modulator circuit 1204 generates the modulation signal S34, which is a PWM signal, from the sine-wave frequency setting signal S33 and the pseudo-sine-wave carrier signal S11, in a manner similar to the triangle-wave carrier signal S11.

Then, as in the modulation signal S34 generated from the triangle-wave carrier signal S11, on the basis of the modulation signal S34 generated from the pseudo-sine-wave carrier signal S11, the AC output voltage Vac is generated through the switch circuit 1206, the second low-pass filter 1207, and the transformer 1208.

The value (amplitude) of the AC output voltage Vac when the carrier signal S11 is a pseudo sine wave is different from that when the carrier signal S11 is a triangle wave. However, the value (amplitude) of the AC output voltage Vac is adjustable by changing the duty ratio of the sine-wave frequency setting signal S33, i.e., the duty ratio of the AC current setting signal S3.

Figure 8:
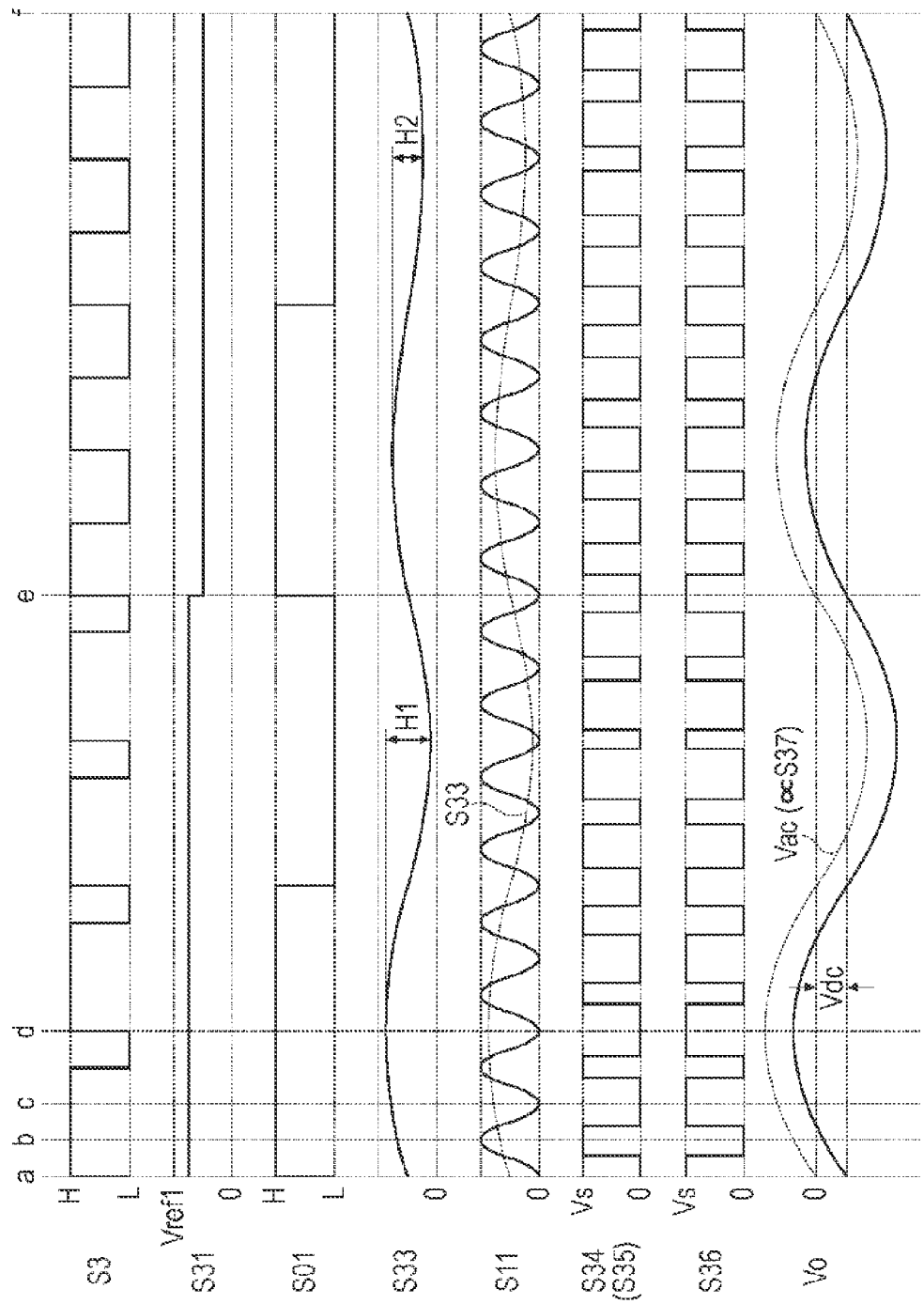
FIG. 8 is a timing chart illustrating the operation of a charging bias power supply unit when the waveform of a carrier signal used in the first exemplary embodiment is a sine wave.

FIG. 8 is a timing chart illustrating the operation of the charging bias power supply unit 13aK when the waveform of the carrier signal S11 used in the first exemplary embodiment is a sine wave. As in FIGS. 6 and 7, in FIG. 8, the AC current setting signal S3, the analog voltage signal S31, the clock signal S01, the sine-wave frequency setting signal S33, the carrier signal S11, the modulation signal S34, the switch output signal S36, and the output voltage Vo are shown. The waveform of the carrier signal S11 is a sine wave which is set in the waveform setting unit 61a.

As in FIGS. 6 and 7, in FIG. 8, the time elapses in alphabetical order, such as time a, time b, time c, and so on. A description of the same portions as those of FIG. 6 will be omitted, and only portions different from those of FIG. 6 will be discussed below.

The AC current setting signal S3, the analog voltage signal S31, the clock signal S01, and the sine-wave frequency setting signal S33 shown in FIG. 8 are the same as those shown in FIG. 6.

In FIG. 8, the waveform of the carrier signal S11 is a sine wave. That is, the carrier signal S11 is a sine wave in which the duration from time a to time c is set as the period of the carrier signal S11.

As stated above, the comparator Cmp of the modulator circuit 1204 compares the voltage of the sine-wave frequency setting signal S33 with the voltage of the sine-wave carrier signal S11 and thereby generates the modulation signal S34 (driving signal S35), which is a PWM signal.

FIG. 8 shows that the comparator Cmp of the modulator circuit 1204 generates the modulation signal S34, which is a PWM signal, from the sine-wave frequency setting signal S33 and the sine-wave carrier signal S11, in a manner similar to the triangle-wave carrier signal S11.

Then, as in the modulation signal S34 generated from the triangle-wave carrier signal S11, on the basis of the modulation signal S34 generated from the sine-wave carrier signal S11, the AC output voltage Vac is generated through the switch circuit 1206, the second low-pass filter 1207, and the transformer 1208.

The value (amplitude) of the AC output voltage Vac when the carrier signal S11 is a sine wave is different from that when the carrier signal S11 is a triangle wave or a pseudo sine wave. However, the value (amplitude) of the AC output voltage Vac is adjustable by changing the duty ratio of the sine-wave frequency setting signal S33, i.e., the duty ratio of the AC current setting signal S3.

In the first exemplary embodiment, a description has been given of a case in which a triangle wave, a pseudo sine wave, and a sine wave are used as the waveform of the carrier signal S11.

FIG. 9 is a timing chart illustrating the operation of the charging bias power supply unit 13aK when the waveform of the carrier signal S11 is a sawtooth wave, which is different from the waveforms used in the first exemplary embodiment.

As in FIGS. 6, 7, and 8, in FIG. 9, the AC current setting signal S3, the analog voltage signal S31, the clock signal S01, the sine-wave frequency setting signal S33, the carrier signal S11, the modulation signal S34, the switch output signal S36, and the output voltage Vo are shown. The waveform of the carrier signal S11 is a sawtooth wave.

As in FIGS. 6, 7, and 8, in FIG. 9, the time elapses in alphabetical order, such as time a, time b, time c, and so on. A description of the same portions as those of FIG. 6 will be omitted, and only portions different from those of FIG. 6 will be discussed below.

The AC current setting signal S3, the analog voltage signal S31, the clock signal S01, and the sine-wave frequency setting signal S33 shown in FIG. 9 are the same as those shown in FIG. 6.

In FIG. 9, the waveform of the carrier signal S11 is a sawtooth wave. That is, in the carrier signal S11, the voltage rises from 0 V from time a to time c, and sharply drops to 0 V at time c. The duration from time a to time c is set as the period of the carrier signal S11.

The comparator Cmp of the modulator circuit 1204 compares the voltage of the sine-wave frequency setting signal S33 with the voltage of the sawtooth-wave carrier signal S11 and thereby generates the modulation signal S34 (driving signal S35), which is a PWM signal.

FIG. 9 shows that the comparator Cmp of the modulator circuit 1204 generates the modulation signal S34, which is a PWM signal, from the sine-wave frequency setting signal S33 and the sawtooth-wave carrier signal S11, in a manner similar to the triangle-wave carrier signal S11.

Then, as in the modulation signal S34 generated from the triangle-wave carrier signal S11, on the basis of the modulation signal S34 generated from the sawtooth-wave carrier signal S11, the AC output voltage Vac is generated through the switch circuit 1206, the second low-pass filter 1207, and the transformer 1208.

Table 1 indicates the ratio of the amplitude of higher harmonic components (second through fifth harmonics) to the amplitude of fundamental wave components obtained as a result of performing Fourier transform on the triangle wave, the sine wave, and the sawtooth wave used as the carrier signal S11. In this case, the amplitude of fundamental wave components is set to be 1.

Table 1 shows that the sine wave contains only fundamental wave components and that the triangle wave contains odd-order higher harmonics, such as the third harmonics and fifth harmonics, in addition to the fundamental wave components, but does not contain even-order higher harmonics.

In contrast, the sawtooth wave contains all types of higher harmonics, such as the second, third, fourth, and fifth harmonics, in addition to the fundamental wave components. The ratios of the amplitudes of the higher harmonics of the sawtooth wave are greater than those of the triangle wave.

That is, although the triangle wave contains higher harmonics, the amplitudes of the higher harmonic components of the triangle wave are smaller than those of the sawtooth wave. The sine wave does not contain higher harmonic components.

TABLE 1

| Waveform | Fundamental wave | Second harmonics | Third harmonics | Fourth harmonics | Fifth harmonics |
|---|---|---|---|---|---|
| Sine wave | 1 | 0 | 0 | 0 | 0 |
| Triangle wave | 1 | 0 | 0.11 | 0 | 0.04 |
| Sawtooth wave | 1 | 0.5 | 0.33 | 0.25 | 0.2 |

Figure 10A:
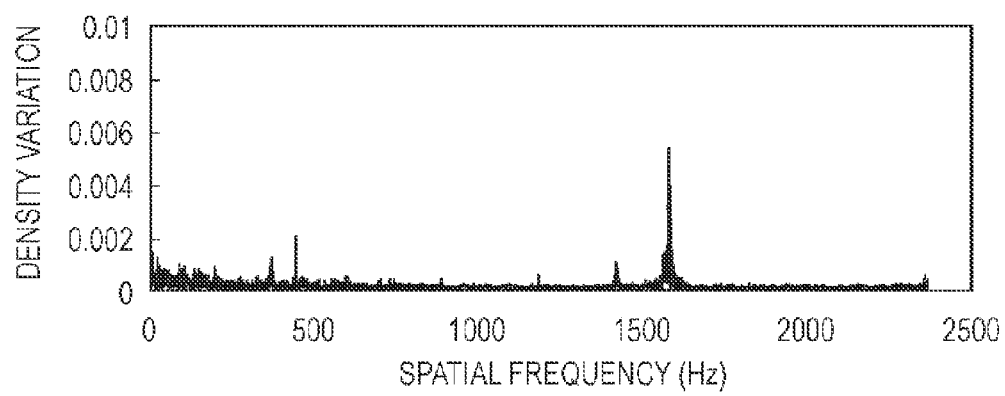
FIGS. 10A through 10C illustrate density variations in images formed in accordance with the waveforms of a carrier signal.
Figure 10B:
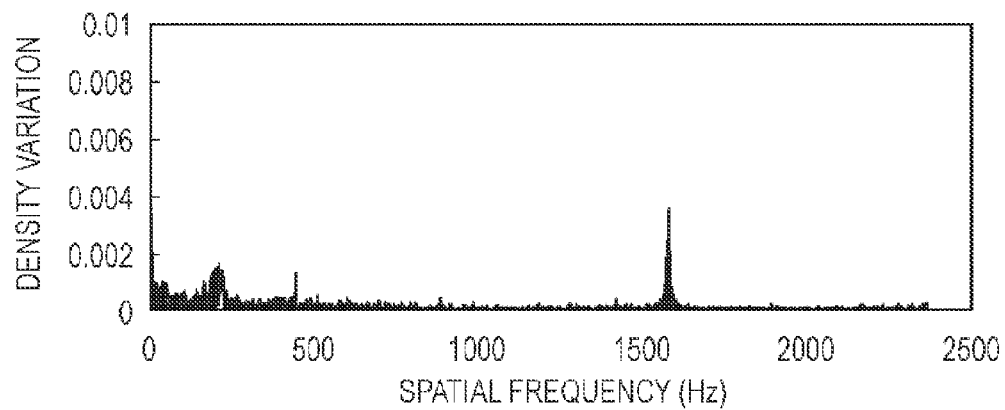
Figure 10C:
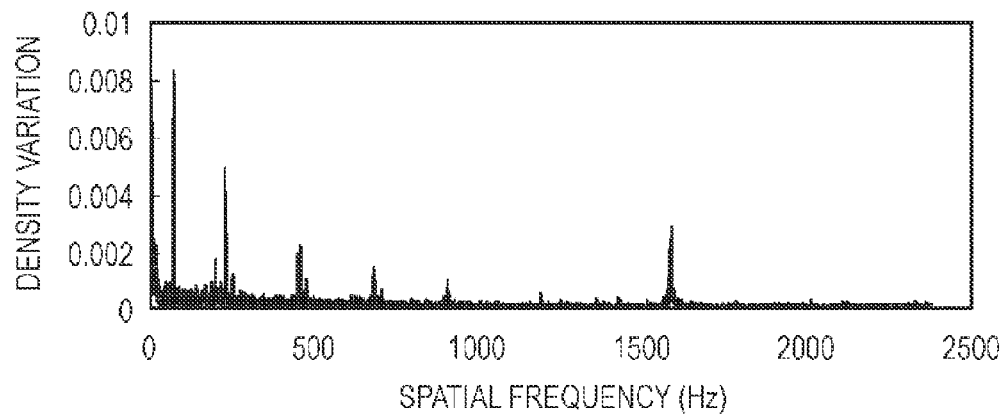

FIGS. 10A, 10B, and 10C illustrate density variations in images formed in accordance with the waveforms of the carrier signal S11. More specifically, FIG. 10A illustrates a density variation when the waveform of the carrier signal S11 used in the first exemplary embodiment is a sine wave. FIG. 10B illustrates a density variation when the waveform of the carrier signal S11 used in the first exemplary embodiment is a triangle wave. FIG. 10C illustrates a density variation when the waveform of the carrier signal S11 is a sawtooth wave, unlike the first exemplary embodiment.

The density variations are determined as follows. The image output controller 30 transmits an image signal indicating an image which will be set to a predetermined density to the print head 14, and such an image is formed on a recording sheet. Then, the image formed on the recording sheet is read by an optical device, such as a scanner, and then, a change in the density (density variation) of the image is calculated. In FIGS. 10A through 10C, the density variation is indicated by the spatial frequency.

When the waveform of the carrier signal S11 used in the first exemplary embodiment shown in FIG. 10A is a sine wave, peaks of the density variation appear when the spatial frequency is 370 Hz, 443 Hz, 1185 Hz, 1422 Hz, and 1578 Hz.

When the waveform of the carrier signal S11 used in the first exemplary embodiment shown in FIG. 10B is a triangle wave, peaks of the density variation appear when the spatial frequency is 211 Hz, 443 Hz, and 1579 Hz.

In contrast, when the waveform of the carrier signal S11 shown in FIG. 10C is a sawtooth wave, unlike the first exemplary embodiment, peaks of the density variation appear when the spatial frequency is 68 Hz, 226 Hz, 443 Hz, 676 Hz, 900 Hz, and 1577 Hz.

Higher spatial frequencies are invisible to the human eye. Accordingly, the range of the spatial frequency visible to the human eye is several hundred of hertz or lower. Accordingly, it is desirable to reduce the density variation when the spatial frequency is 1000 Hz or lower.

In a range of the spatial frequency at 1000 Hz or lower, the number of peaks of the density variation when the waveform of the carrier signal S11 is a sine wave (FIG. 10A) or a triangle wave (FIG. 10B) is smaller than that when the waveform of the carrier signal S11 is a sawtooth wave (FIG. 10C). The reason for this may be as follows. The sine wave or the triangle wave contains less higher harmonic components than the sawtooth wave, and thus, there is a smaller possibility that the interference of the carrier signal S11 having a waveform of a sine wave or a triangle wave with another signal will occur.

There is no large difference between the number of peaks of the density variation when the waveform of the carrier signal S11 is a sine wave (FIG. 10A) and that when the waveform of the carrier signal S11 is a triangle wave (FIG. 10B). However, the density variation with respect to frequencies corresponding to peaks when the waveform of the carrier signal S11 is a triangle wave is slightly smaller than that when the waveform of the carrier signal S11 is a sine wave. On the other hand, however, the density variation with respect to frequencies other than the frequencies corresponding to peaks when the waveform of the carrier signal S11 is a sine wave is smaller than that when the waveform of the carrier signal S11 is a triangle wave.

As described above, the density variation can be reduced by using a waveform containing small higher harmonic components for the carrier signal S11.

FIG. 10B shows that the density variation can be reduced when the waveform of the carrier signal S11 is a triangle wave, as well as when the waveform of the carrier signal S11 is a sine wave. Concerning the triangle wave, the voltage changes linearly with respect to time, thereby making it easy to set the modulation signal S34 (driving signal S35).

Accordingly, it is desirable to select the waveform of the carrier signal S11 depending on the processing speed of the image forming apparatus 1 or the type of image to be formed.

Additionally, if the frequency of the clock signal S01 or S02 is increased in order to accelerate the processing speed of the image forming apparatus 1, it is desirable to select the waveform of the carrier signal S11 that is possible to reduce degradation of the image, i.e., the density variation. That is, the waveform of the carrier signal S11 may be selected in accordance with the frequency of the AC current setting signal S3.

The charging bias power supply unit 13a detects the AC output current Iac and performs feedback control so that the AC output current Iac may become a value which has been determined by the AC current setting signal S3. Additionally, the developing bias power supply unit 15a detects the AC output voltage Vac and performs feedback control so that the AC output voltage Vac may become a value which has been determined by an AC voltage setting signal.

Accordingly, it is not necessary that the AC current setting signal S3 be set in accordance with the waveform of the carrier signal S11, and instead, the AC output voltage Vac (AC output current Iac) is fed back so that it may be set to the value determined by the AC current setting signal S3. Thus, the influence of the waveform selected for the carrier signal S11 on the modulation signal S34 to be generated is reduced.

For reducing the density variation in an image formed by the image forming apparatus 1 caused by the interference with the carrier signal S11, the frequency of the carrier signal S11 may be swept over time (spread spectrum). In this method, since the frequency of the carrier signal S11 is not fixed, the density variation in a specific frequency can be further reduced. However, there is a greater possibility that the interference of the carrier signal S11 with another signal will occur, and also, a device (e.g., a circuit) for sweeping the frequency is necessary.

In contrast, in the first exemplary embodiment, since the frequency of the carrier signal S11 is fixed, there is a smaller possibility that the interference of the carrier signal S11 with another signal will occur, and also, a device for sweeping the frequency is not necessary.

If the charging bias power supply units 13aY, 13aM, 13aC, and 13aK and the developing bias power supply units 15aY, 15aM, 15aC, and 15aK are provided (see FIG. 2), each of the reference signal S0, the source signal S1 (carrier signal S11) and the clock signal S01 transmitted to the charging bias power supply units 13aY, 13aM, 13aC, and 13aK, and the source signal S2 (carrier signal S21) and the clock signal S02 transmitted to the developing bias power supply units 15aY, 15aM, 15aC, and 15aK may desirably a continuous signal such that the signal reaches its nodes at the same time (the synchronization is provided). With this arrangement, the occurrence of noise caused by the interference of different signals can be reduced.

The reference signal generator 70, the dividers 71a and 71b, the source signal generators 60a and 60b, the waveform setting units 61a and 61b, the charging bias power supply units 13aY, 13aM, 13aC, and 13aK, and the developing bias power supply units 15aY, 15aM, 15aC, and 15aK may be individually formed on different circuit boards. Alternatively, all or some of these components may be formed on a single circuit board.

Additionally, all or some of the reference signal generator 70, the dividers 71a and 71b, the source signal generators 60a and 60b, and the waveform setting units 61a and 61b may be included in the image output controller 30.

Second Exemplary Embodiment

In the first exemplary embodiment, as shown in FIG. 5, the waveform setting unit 61a converts the waveform of the source signal S1 generated by the source signal generator 60a by using resistors, capacitors, and diodes, thereby generating the carrier signal S11.

In the second exemplary embodiment, the waveform setting unit 61a includes a digital-to-analog converter (DAC) and generates the carrier signal S11 by performing digital processing.

A description of the same portions as those of the first exemplary embodiment will be omitted, and only portions different from those of the first exemplary embodiment will be discussed below.

Waveform Setting Unit 61a

Figure 11A:
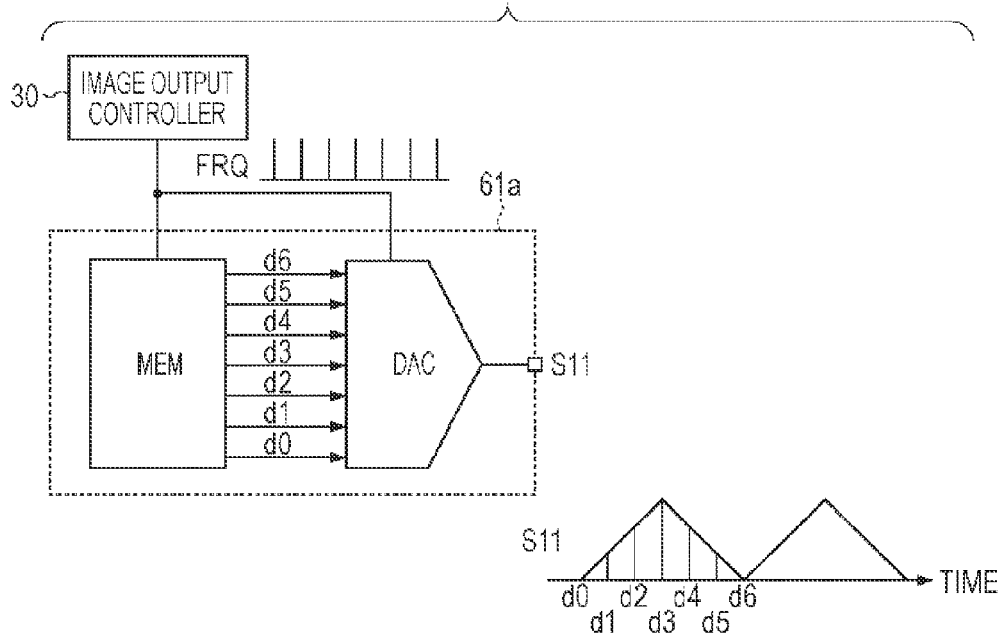
FIGS. 11A and 11B illustrate examples of the configuration of a waveform setting unit according to a second exemplary embodiment.
Figure 11B:
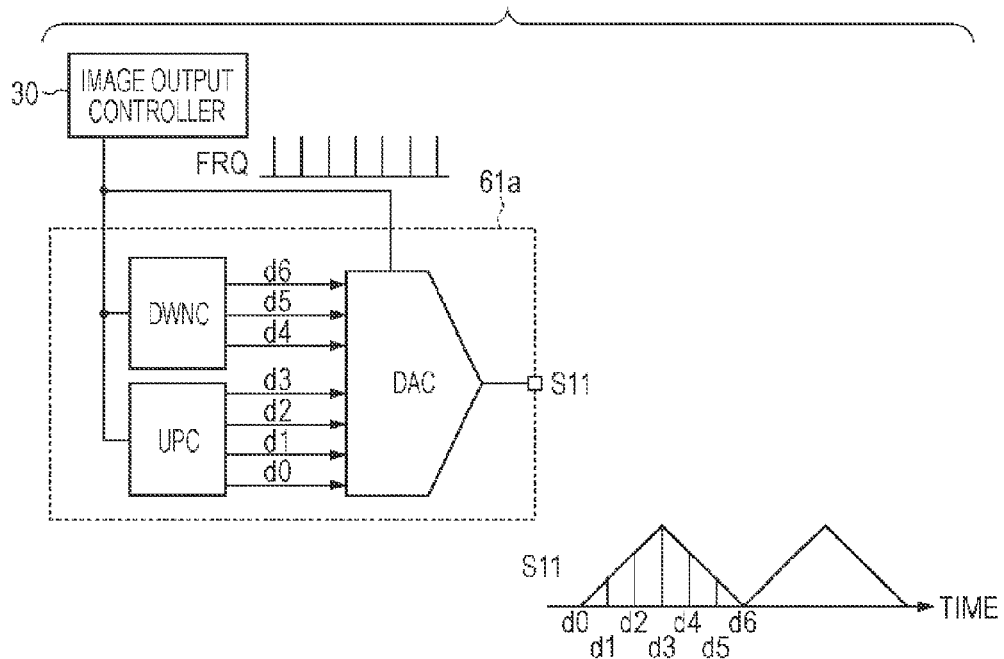

FIGS. 11A and 11B illustrate examples of the configuration of the waveform setting unit 61a of the second exemplary embodiment. The waveform setting unit 61a shown in FIG. 11A includes a DA converter DAC and a memory MEM. The memory MEM may be disposed in the image output controller 30. The waveform setting unit 61a shown in FIG. 11B includes a DA converter DAC, an up counter UPC, and a down counter DWNC. The up counter UPC and the down counter DWNC may be disposed in the image output controller 30.

In FIGS. 11A and 11B, the block configuration of the waveform setting unit 61a is shown on the left side, and the triangle-waveform carrier signal S11 is shown on the right side.

A pulsating timing signal FRQ is supplied to the waveform setting unit 61a from the image output controller 30.

A description will first be given of the waveform setting unit 61a including the DA converter DAC and the memory MEM shown in FIG. 11A. Waveform data items d0 through d6 for generating the triangle-wave carrier signal S11 are written into the memory MEM in advance.

Every time the pulsating timing signal FRQ is input into the waveform setting unit 61a, the waveform data items d0 through d6 are sequentially read from predetermined addresses of the memory MEM and are input into the DA converter DAC. Upon receiving the waveform data items d0 through d6, the DA converter DAC sequentially converts the waveform data items d0 through d6 into DC voltages.

In this case, if the waveform data items d0 through d3 indicate voltages which gradually increase with respect to time, and if the waveform data items d4 through d6 indicate voltages which gradually decrease with respect to time, the output waveform becomes a triangle wave, as indicated on the right side of FIG. 11A.

Then, by repeatedly reading the waveform data items d0 through d6, the carrier signal S11 having a triangle waveform is output.

By writing the waveform data items d0 through d6 for generating a predetermined waveform into the memory MEM, the output waveform of the carrier signal S11 may become the predetermined waveform, such as a sine wave or a pseudo sine wave.

The waveform setting unit 61a including the DA converter DAC, the up counter UPC, and the down counter DWNC shown in FIG. 11B will now be discussed below.

The up counter UPC increments the timing signal FRQ supplied from the image output controller 30. That is, every time the timing signal FRQ is input, the output of the up counter UPC is incremented, such as "0", "1", "2", "3", and so on. In this case, in synchronization with a change in the output of the up counter UPC, the output of the up counter UPC is input into the DA converter DAC. Then, the output of the DA converter DAC gradually increases with respect to time.

Then, after the lapse of a predetermined time, the input of the DA converter DAC is switched from the up counter UPC to the down counter DWNC. The down counter DWNC decrements the timing signal FRQ supplied from the image output controller 30 from a predetermined value. That is, every time the timing signal FRQ is input, the output of the down counter DWNC is decremented from "N" ("N" is the maximum value counted by the up counter UPC), such as "N–1", "N–2", "N–3", and so on. In this case, in synchronization with a change in the output of the down counter DWNC, the output of the down counter DWNC is input into the DA converter DAC. Then, the output of the DA converter DAC gradually decreases with respect to time.

In this case, if the outputs of the up counter UPC "0", "1", "2", and "3" are set to be waveform data items d0, d1, d2, and d3, respectively, and if the outputs of the down counter DWNC "N–1(2)", "N–2(1)", and "N–3(0)" (N is 3) are set to be waveform data items d4, d5, and d6, respectively, the output waveform becomes a triangle wave, as indicated on the right side of FIG. 11B.

Then, by alternately repeating the incrementing operation of the up counter UPC and the decrementing operation of the down counter DWNC while switching the connection to the DA converter DAC between the up counter UPC and the down counter DWNC, the carrier signal S11 having a triangle waveform is output.

The carrier signal S11 having a waveform other than a triangle wave may be obtained, for example, by applying a weight between the DA converter DAC and the up counter UPC or the down counter DWNC in accordance with a value counted by the up counter UPC or the down counter DWNC.

As described above, in the second exemplary embodiment, the waveform of the carrier signal S11 is generated by performing digital processing. In this case, the voltage resolution is determined by the resolution (number of bits) of the DA converter DAC. The time increments are determined by the interval of the timing signal FRQ, and the DA converter DAC, and the reading speed of the waveform data from the memory MEM (FIG. 11A) or the operating speed of the up counter UPC and the down counter DWNC (FIG. 11B).

Accordingly, the above-described components of the waveform setting unit 61a may be selected in accordance with a predetermined voltage resolution and predetermined time increments.

By using the generated carrier signal S11, the bias power supply apparatus 100 and the image processing apparatus 1 are operated in a manner similar to the first exemplary embodiment, and thus, an explanation thereof will be omitted.

In the first and second exemplary embodiments, the bias power supply apparatus 100 including the charging bias power supply unit 13aK and the waveform setting unit 61a has been described by way of example. As stated above, the bias power supply apparatus 100 may be constituted by other components.

In the first and second exemplary embodiments, negative charging type toner is used. However, positive charging type toner may be used, instead. In this case, the polarity of the DC output voltage Vdc output from the charging bias power supply unit 13a and that output from the developing bias power supply unit 15a are set to be opposite (positive (+) voltage) to that when the negative charging type toner is used.

In the first and second exemplary embodiments, the AC current setting signal S3 (see FIGS. 6 through 9) and the DC voltage setting signal S4 output from the image output controller 30 take two voltage values, i.e., "H" and "L". In this case, digital voltage signals are used so that they may be less vulnerable to the influence of noise when being transmitted from the image output controller 30 to the charging bias power supply unit 13a. Alternatively, the AC current setting signal S3 and the DC voltage setting signal S4 may be analog voltage signals, in which case, the analog voltage converter circuits 1201 and 1251 of the charging bias power supply unit 13aK may be omitted.

In the first and second exemplary embodiments, the image forming apparatus 1 is of a tandem type including the plural photoconductors 12 corresponding to individual colors, such as Y, M, C, and K. Alternatively, the image forming apparatus 1 may be of a multiple (rotary) type including a rotary developing device to which plural developing units corresponding to individual colors, such as Y, M, C, and K, are rotatably attached. In this case, it is sufficient that the bias power supply apparatus 100 includes only one charging bias power supply unit 13a and one developing bias power supply unit 15a.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
an image carrier;
a charging unit configured to generate a charging electric field in which an alternating current and a direct current are superposed on each other, and to charge the image carrier with the generated charging electric field;
an exposure unit configured to expose the image carrier charged by the charging unit to light, and to form an electrostatic latent image on the image carrier;
a developing unit configured to generate a developing electric field in which an alternating current and a direct current are superposed on each other, and to develop the electrostatic latent image formed on the image carrier so as to form a developed image; and
a transfer unit configured to transfer the developed image onto a transfer subject,
wherein at least one of the charging electric field generated by the charging unit and the developing electric field generated by the developing unit is generated by a bias power supply unit,
the bias power supply unit includes:
a transformer including a primary winding and a secondary winding, alternating current power being output from the secondary winding as a result of a current being supplied to the primary winding;
a switch circuit that includes a switching device, the switching circuit being configured to supply the current to the primary winding of the transformer by switching the switching device on the basis of a received modulation signal;
a modulator circuit configured to receive a frequency setting signal for setting a frequency of the alternating current power and a carrier signal for setting a frequency of the modulation signal, and to generate the modulation signal subjected to pulse width modulation on the basis of the frequency setting signal and the carrier signal; and
a waveform setting unit configured to set a waveform of the carrier signal.

2. A bias power supply apparatus comprising:
a transformer including a primary winding and a secondary winding, alternating current power being output from the secondary winding as a result of a current being supplied to the primary winding;
a switch circuit that includes a switching device, the switching circuit being configured to supply the current to the primary winding of the transformer by switching the switching device on the basis of a received modulation signal;
a modulator circuit configured to receive a frequency setting signal for setting a frequency of the alternating current power and a carrier signal for setting a frequency of the modulation signal, and to generate the modulation signal subjected to pulse width modulation on the basis of the frequency setting signal and the carrier signal; and
a waveform setting unit configured to set a waveform of the carrier signal.

3. The bias power supply apparatus according to claim 2, wherein the waveform setting unit is configured to set, in response to the waveform of the carrier signal being a sawtooth wave, the waveform of the carrier signal such that the ratio of the amplitude of higher harmonic components to the amplitude of fundamental wave components is smaller than the ratio of the amplitude of higher harmonic components to the amplitude of fundamental wave components.

4. The bias power supply apparatus according to claim 2, wherein the waveform setting unit is configured to set the waveform of the carrier signal such that the waveform does not contain even-order higher harmonic components.

5. The bias power supply apparatus according to claim 3, wherein the waveform setting unit is configured to set the waveform of the carrier signal such that the waveform does not contain even-order higher harmonic components.

6. A bias power supply method comprising:
outputting alternating current power to a load connected to a secondary winding of a transformer as a result of a current being supplied to a primary winding of the transformer;
supplying the current to the primary winding of the transformer by switching a switching device on the basis of a received modulation signal;
receiving a frequency setting signal for setting a frequency of the alternating current power and a carrier signal for setting a frequency of the modulation signal and generating the modulation signal subjected to pulse width modulation on the basis of the frequency setting signal and the carrier signal; and
setting a waveform of the carrier signal.

7. The bias power supply apparatus according to claim 2, wherein the waveform setting unit is further configured to receive a source signal having a first waveform and a first frequency, and to set the waveform of the carrier signal to have a second waveform different from the first waveform and to have the first frequency.

8. The bias power supply apparatus according to claim 7, wherein the first frequency is a fixed frequency.

9. The bias power supply apparatus according to claim 2, wherein the waveform setting unit is configured to set the waveform of the carrier signal to be one of a triangle wave, a pseudo sine wave, and a sine wave.

* * * * *